United States Patent
Chan et al.

(10) Patent No.: US 9,488,482 B2
(45) Date of Patent: Nov. 8, 2016

(54) SYSTEMS AND METHODS FOR ADJUSTING A CONTOUR OF A VEHICLE BASED ON A PROTRUSION

(71) Applicant: Elwha LLC, Bellevue, WA (US)

(72) Inventors: Alistair K. Chan, Bainbridge Island, WA (US); Hon Wah Chin, Palo Alto, CA (US); William D. Duncan, Kirkland, WA (US); Roderick A. Hyde, Redmond, WA (US); Jordin T. Kare, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 374 days.

(21) Appl. No.: 14/015,283

(22) Filed: Aug. 30, 2013

(65) Prior Publication Data
US 2015/0066349 A1    Mar. 5, 2015

(51) Int. Cl.
| G01C 21/34 | (2006.01) |
| G01C 21/26 | (2006.01) |
| B60W 30/08 | (2012.01) |
| G01C 21/36 | (2006.01) |
| G08G 1/16  | (2006.01) |
| B60Q 1/00  | (2006.01) |
| B60Q 5/00  | (2006.01) |
| G01S 13/04 | (2006.01) |

(52) U.S. Cl.
CPC ............ *G01C 21/26* (2013.01); *B60Q 1/00* (2013.01); *B60Q 5/006* (2013.01); *B60W 30/08* (2013.01); *G01C 21/3407* (2013.01); *G01C 21/3697* (2013.01); *G01S 13/04* (2013.01); *G08G 1/16* (2013.01); *G01C 21/3461* (2013.01)

(58) Field of Classification Search
CPC .... B60W 30/08; G08G 1/16; G01C 21/3697
See application file for complete search history.

(56) References Cited

U.S. PATENT DOCUMENTS

| 6,108,592 | A  | 8/2000  | Kurtzberg et al. |
| 6,297,738 | B1 | 10/2001 | Newham |
| 6,842,692 | B2 | 1/2005  | Fehr et al. |
| 7,204,328 | B2 | 4/2007  | LoPresti |
| 7,426,970 | B2 | 9/2008  | Olsen |
| 7,940,187 | B2 | 5/2011  | Newham |
| 8,013,722 | B2 | 9/2011  | Breuer et al. |
| 8,203,454 | B2 | 6/2012  | Knight et al. |
| 2004/0006422 | A1 | 1/2004 | Fehr et al. |
| 2004/0008514 | A1* | 1/2004 | Lee ............... G07B 15/06 362/259 |
| 2004/0075847 | A1 | 4/2004 | McCracken |

(Continued)

FOREIGN PATENT DOCUMENTS

KR    10-0908076 B1    7/2009

OTHER PUBLICATIONS

PCT International Search Report; International App. No. PCT/US2014/052883; Dec. 22, 2014; pp. 1-3.

*Primary Examiner* — Thomas G Black
*Assistant Examiner* — Peter D Nolan
(74) *Attorney, Agent, or Firm* — Foley & Lardner LLP

(57) ABSTRACT

A system for informing a navigation system of a vehicle of a protrusion includes a sensor and a processing circuit. The sensor is configured to generate sensor data based on a position of cargo. The processing circuit is configured to determine a contour of the vehicle, detect protruding cargo extending outside the contour of the vehicle, where detecting the protruding cargo is based on the sensor data and the contour, and notify the navigation system of the vehicle of the protruding cargo.

18 Claims, 15 Drawing Sheets

(56) References Cited

U.S. PATENT DOCUMENTS

| | | | |
|---|---|---|---|
| 2004/0167718 A1* | 8/2004 | Hoenes | B60Q 9/006 701/301 |
| 2004/0181338 A1* | 9/2004 | Dobler | G08G 1/166 701/301 |
| 2004/0267442 A1 | 12/2004 | Fehr et al. | |
| 2005/0240317 A1 | 10/2005 | Kienzle-Lietl | |
| 2005/0279551 A1 | 12/2005 | LoPresti | |
| 2007/0103282 A1* | 5/2007 | Caird | B60Q 9/00 340/435 |
| 2007/0132597 A1 | 6/2007 | Rodgers | |
| 2007/0138347 A1 | 6/2007 | Ehlers | |
| 2007/0152427 A1 | 7/2007 | Olsen | |
| 2007/0241869 A1 | 10/2007 | Kalous | |
| 2008/0021731 A1 | 1/2008 | Rodgers | |
| 2008/0059055 A1 | 3/2008 | Geelen et al. | |
| 2008/0072444 A1* | 3/2008 | Harrill | G01B 11/002 33/600 |
| 2008/0180267 A1 | 7/2008 | Kaneko et al. | |
| 2009/0121852 A1 | 5/2009 | Breuer et al. | |
| 2009/0184811 A1 | 7/2009 | Althoff | |
| 2009/0278934 A1 | 11/2009 | Ecker et al. | |
| 2010/0039269 A1 | 2/2010 | Newham | |
| 2011/0181457 A1* | 7/2011 | Basten | G01B 7/042 342/70 |
| 2011/0184642 A1 | 7/2011 | Rotz et al. | |
| 2012/0046821 A1 | 2/2012 | Pettersson et al. | |
| 2012/0101402 A1 | 4/2012 | Nguyen | |
| 2013/0099910 A1* | 4/2013 | Merritt | G01S 7/003 340/435 |
| 2013/0222592 A1* | 8/2013 | Gieseke | G08G 1/04 348/148 |

* cited by examiner

SYSTEMS AND METHODS FOR ADJUSTING A CONTOUR OF A VEHICLE BASED ON A PROTRUSION

BACKGROUND

Vehicles, and in particular, robotic or remotely driven vehicles, may be provided with a navigation system that includes an automatic guidance and collision avoidance system. In general, these automatic collision avoidance systems utilize a defined envelope related to the cross-section of the vehicle while attempting to avoid collisions. As the vehicle moves about, the cargo of the vehicle may shift to extend beyond the ordinary envelope of the vehicle. However, the operator of the vehicle, and the vehicle's automatic collision avoidance system may be unaware of the protruding cargo. As the vehicle continues to move, the protruding cargo is vulnerable to collisions with other vehicles, signposts, trees, and structures.

SUMMARY

One embodiment relates to a system for informing a navigation system of a vehicle of a protrusion includes a sensor and a processing circuit. The sensor is configured to generate sensor data based on a position of cargo. The processing circuit is configured to determine a contour of the vehicle, detect protruding cargo extending outside the contour of the vehicle, wherein detecting the protruding cargo is based on the sensor data and the contour, and notify the navigation system of the vehicle of the protruding cargo.

Another embodiment relates to a method of informing a navigation system of a vehicle of a protrusion. The method includes acquiring sensor data from a sensor based on a position of cargo, determining a contour of the vehicle, detecting protruding cargo extending outside the contour of the vehicle based on the sensor data and the contour, and notifying the navigation system of the vehicle of the protruding cargo.

Another embodiment relates to a non-transitory computer-readable medium having instructions stored thereon, the instructions forming a program for informing a navigation system of a vehicle of a protrusion, the program executable by a computing device, that when executed by the computing device cause the computing device to perform operations including: acquiring sensor data from a sensor configured to generate the sensor data based on a position of cargo, determining a contour of the vehicle, detecting protruding cargo extending outside the contour of the vehicle based on the sensor data and the contour, and notifying the navigation system of the vehicle of the protruding cargo.

Another embodiment relates to a system for identifying a susceptibility of a vehicle to a size restriction including a sensor and a processing circuit. The sensor is configured to generate sensor data based on a position of cargo. The processing circuit is configured to determine a contour of the vehicle, determine a size limit on a route of the vehicle, detect protruding cargo extending outside the contour of the vehicle based on the sensor data and the contour, generate an updated contour of the vehicle based on the protruding cargo, determine a susceptibility of the vehicle to the size limit based on the updated contour, and notify a navigation system of the vehicle of the susceptibility of the vehicle to the size limit.

Another embodiment relates to a method of identifying a susceptibility of a vehicle to a size restriction. The method includes acquiring sensor data from a sensor based on a position of cargo, determining a contour of the vehicle, determining a size limit on a route of the vehicle, detecting protruding cargo extending outside the contour of the vehicle based on the sensor data and the contour, generating an updated contour of the vehicle based on the protruding cargo, determining a susceptibility of the vehicle to the size limit based on the updated contour, and notifying a navigation system of the vehicle of the susceptibility of the vehicle to the size limit.

Another embodiment relates to a non-transitory computer-readable medium having instructions stored thereon, the instructions forming a program for identifying a susceptibility of a vehicle to a size restriction, the program executable by a computing device, that when executed by the computing device cause the computing device to perform operations including: acquiring sensor data from a sensor, wherein the sensor data based on a position of cargo, determining a contour of the vehicle, determining a size limit on a route of the vehicle, detecting protruding cargo extending outside the contour of the vehicle based on the sensor data and the contour, generating an updated contour of the vehicle based on the protruding cargo, determining a susceptibility of the vehicle to the size limit based on the updated contour, and notifying a navigation system of the vehicle of the susceptibility of the vehicle to the size limit.

Another embodiment relates to a system for identifying a susceptibility of a vehicle approaching a structure to a size restriction of the structure, comprising a detector configured to detect the approaching vehicle, and a processing circuit configured to identify the vehicle based on data from the detector, access a database to determine a contour of the identified vehicle, wherein the database is configured to store vehicle contour information, compare the contour of the vehicle to a size limit of the structure, and determine a susceptibility of the vehicle to the size limit based on the comparison.

Another embodiment relates to a method of identifying a susceptibility of a vehicle approaching a structure to a size restriction of the structure. The method includes acquiring data from a detector configured to detect the approaching vehicle, identifying, with a processing circuit, the vehicle based on the data from the detector, accessing a database to determine a contour of the identified vehicle, wherein the database is configured to store vehicle contour information, comparing the contour of the vehicle to a size limit of the structure, and determining a susceptibility of the vehicle to the size limit based on the comparison.

Another embodiment relates to a non-transitory computer-readable medium having instructions stored thereon, the instructions forming a program executable by a computing device for identifying a susceptibility of a vehicle approaching a structure to a size restriction of the structure, that when executed by the computing device cause the computing device to perform operations including: acquiring data from a detector configured to detect the approaching vehicle, identifying the vehicle based on the data from the detector, accessing a database to determine a contour of the identified vehicle, wherein the database is configured to store vehicle contour information, comparing the contour of the vehicle to a size limit of the structure, and determining a susceptibility of the vehicle to the size limit based on the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
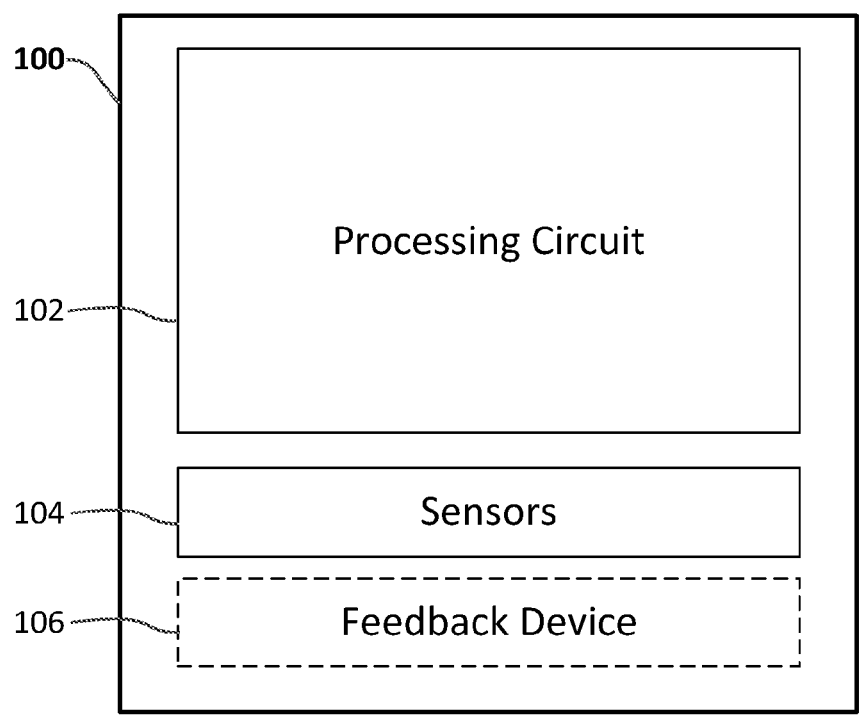
FIG. 1 is a block diagram of a system for informing a navigation system of a vehicle of a protrusion according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments for informing a navigation system of a vehicle of a protrusion are shown and described. A vehicle (e.g., a car, a truck, a train, a subway car, a boat, construction equipment, etc.) may be equipped with a navigation system that has collision avoidance and/or automated guidance capabilities. In general, the navigation system may utilize a collision avoidance algorithm that considers the vehicle's contour as the system is controlling the vehicle. The contour of the vehicle may include general or specific dimensions of the vehicle, and may include the dimensions of equipment (e.g., a trailer, towed items, top-mounted containers, bike/luggage racks, etc.) coupled to the vehicle. The decision to incorporate the contour of a trailer or mounted container with the vehicle's native contour may be made based on sensor input (e.g., a camera, or a load sensor detecting their attachment to the vehicle). A vehicle may also be remotely or robotically driven, and such collision avoidance systems may be used to steer the vehicle safely along its route. Alternatively, the vehicle may be controlled by a driver, and the collision avoidance system may be used to notify the driver of an impending collision, or to assume control of the vehicle or influence the driver's control of the vehicle while attempting to avoid a collision. As the vehicle moves about, cargo of the vehicle (e.g., a person, a load, goods, an object, a pet, etc.) may shift such that the cargo extends beyond the normal envelope/dimensions, or contour, of the vehicle. For example, a passenger may extend his or her arms outside a car window as the car drives. As the car moves, the passenger's extended extremities are vulnerable to collisions. As another example, items affixed to a roof rack of a car may shift such that the items extend off to the side of the car. Alternatively, the cargo may have initially been placed in a manner such that it extends beyond the typical vehicle dimensions. For example, a load of beams in the back of a truck may have been placed such that the beams extend off of the bed of the truck. As the truck moves, the extended beams are vulnerable to collisions with other traffic, buildings, road signs, a bridge, a tunnel, etc. In any of these scenarios, the operator of the vehicle may not be aware of the protruding cargo. Similarly, the navigation and collision avoidance systems of the vehicle may not take the protrusions into account. Sensing devices and a processing circuit may be utilized to detect the dangerous condition of the protruding cargo and generate an updated contour of the vehicle, which includes the additional space or extended contour taken up by the protruding cargo. The updated contour may be formed according to three-dimensions and may generally correspond to overall vehicle dimensions, may be localized to the area of the protruding cargo, and may include the dimensions of equipment (e.g., a trailer, towed items, etc.) coupled to the vehicle. For example, a vehicle may be treated as if it is 12 inches wider if an occupant's arm is extended outside the ordinary bounds of the vehicle by a few inches. In the instance of multiple protrusions, the updated contour may include varying dimensions to account for each, or some, of the protrusions. The updated contour may be provided to a navigation system of the vehicle to be used by the navigation system, which may include a collision avoidance system, an automatic guidance system, a collision alert system, etc. The protruding cargo may be detected through the use of imaging sensors (e.g., cameras, wide-field-of-view cameras, RFID sensors, infrared devices, optical links, etc.), which are able to sense the position of an object or occupant (including the position of a protrusion) relative to the vehicle. Additionally, cargo protrusions may be estimated or inferred by the processing circuit based on knowledge of the type of cargo or a cargo model (e.g., including dimensions, shapes, etc.). For example, a non-protruding portion of the cargo may be detected based on the position of the cargo, and then a protruding portion may be estimated or inferred by comparing the non-protruding portion to the model of the cargo. For example, a protruding portion (e.g., the tip, an edge, etc.) of the cargo may be directly detected based on the position of the cargo. As another example, a protruding portion (e.g., the tip, an edge, etc.) of the cargo may be detected based on the position of the cargo and then a further protruding portion may be estimated or inferred by comparing the detected protruding portion to the model of the cargo. Sensors such as imagers, pressure sensors, capacitance sensors, and the like, may also be used to ascertain the cargo's position and location with respect to the vehicle. By providing an updated contour to the navigation system, the vehicle may take into account the protruding cargo in order to safely navigate, before a collision occurs.

Various embodiments for identifying a susceptibility of a vehicle to a size restriction are also shown and described. A vehicle may be equipped with a navigation system as described above, or a remote navigation system may be utilized to steer the vehicle. Sensing devices and a processing circuit may be utilized to detect protruding cargo as discussed above. The processing circuit may also determine a specific or estimated amount of a protrusion. The processing circuit may calculate the amount based on sensor measurement data. The processing circuit may also determine a specific or estimated amount that cargo is protruding based on sensor measurement data, or the processing circuit may estimate or otherwise infer the cargo protrusion amount based on a model or non-protruding portions of the cargo. After protruding cargo is detected, the processing circuit may determine the susceptibility of the vehicle to size limits (e.g., height restrictions, width restrictions, length restrictions, etc.) along the route of the vehicle. For example, a size limit may be due to the height of a bridge, the height of a garage, the width of a tunnel, etc. The processing circuit may inform the navigation system of the susceptibility of the vehicle to the size limit, and the navigation system may use the provided data in its collision avoidance/detection and navigation systems, and may further use the data to determine an updated and suitable route for the vehicle with the protruding cargo. The processing circuit may also generate an updated contour and provide the updated contour to a navigation system as described by the systems disclosed herein.

The described systems herein may be enabled or disabled by a user as the user desires. Additionally, a user may specify preferences in order to set characteristics of warnings and cargo, and set the sensitivity of sensors, etc. User preferences and settings may be stored in a preference file. For example, one user's preference may be for a 6 inch "safety zone" beyond the physical contour of the vehicle and protrusion, while another user may prefer no safety zone. Default operating values may also be provided. Additionally, the features of the various embodiments herein and sensor configurations may be combined.

Referring to FIG. 1, a block diagram of system 100 for informing a navigation system of a vehicle of a protrusion is shown. System 100 may also be used for identifying a susceptibility of a vehicle to a size restriction. According to one embodiment, system 100 includes processing circuit 102, and sensors 104 for sensing information related to the cargo's position and providing the information to processing circuit 102. As used herein, the cargo may refer to any person, animal, or anything carried, transported, or otherwise towed by the vehicle. System 100 is configured to notify the navigation system of a vehicle of a protruding cargo condition. In other embodiments, system 100 may generate an updated contour of a vehicle to include the area of space taken up by the protrusion, and system 100 may provide the updated contour to the navigation system. System 100 may also generate characteristics of protrusions, including height, width, and length measurements of protrusions. In other embodiments, system 100 may analyze a protrusion and determine the susceptibility a vehicle to a size limit along a route of the vehicle.

System 100 may provide the analysis to a navigation system of the vehicle. In some embodiments, system 100 also includes feedback device 106 for providing a warning related to protruding cargo. In other embodiments, system 100 may provide warnings through feedback device 106 and inform the navigation system. Sensors 104 include all sensing components necessary for sensing protruding cargo. Sensors 104 may include a single sensor device, or multiple sensors. Sensors 104 may be imaging sensors, cameras, laser sensors, radar sensors, RFID sensors, infrared sensors, optical sensors, pressure sensors, capacitive sensors, GPS sensors, ultrasonic sensors, magnetic sensors, etc., or any combination of sensors. Cameras may include wide-field-of-view cameras, infrared cameras, 3-D cameras (e.g., stereoscopic cameras, cameras that determine range from depth-of-focus, etc.), may use artificial illumination, etc. Cameras or other imaging sensors may be located on the vehicle, or may be external to it, reporting via a wired connection or wirelessly to processing circuit 102. Sensors 104 may be communicably coupled to processing circuit 102. Processing circuit 102 analyzes the sensor data and detects protruding cargo based on the sensor data.

Processing circuit 102 may also determine characteristics of the protruding cargo (e.g., what specific body part is protruding for a protruding extremity, an amount of protrusion, a location of protrusion, the type of cargo that is protruding, etc.). In one embodiment, processing circuit 102 generates a warning and outputs the warning to feedback device 106. Feedback device 106 may be a display screen, a speaker, a mechanical feedback device, or any device capable of providing feedback related to a protrusion. For example, feedback device 106 may include an LCD display screen coupled to the vehicle. As another example, feedback device 106 may be an external feedback device wirelessly connected to processing circuit 102 (e.g., a terminal at a gas station, etc.). Processing circuit 102 notifies a navigation system of the vehicle of the protruding cargo, which may include multiple protrusions. The navigation system may utilize the information during navigation and/or collision detection. Processing circuit 102 may also calculate an updated vehicle contour, including the bounds of the protruding extremity, and provide the updated contour to the navigation system. Processing circuit 102 may further analyze a route of the vehicle and compare various size limits along the route to the dimensions of the vehicle including the protrusion. Based on the analysis, processing circuit 102 determines the susceptibility (e.g., likelihood of collision, feasibility of the route, etc.) of the vehicle to the size limits, and provides the analysis to the navigation system.

According to one embodiment, system 100 includes processing circuit 102, and sensors 104 for sensing information related to an object's position and providing the information to processing circuit 102. In some embodiments system 100 may lack sensors 104 and may be configured receive data input related to protrusions. In some embodiments system 100 may lack feedback device 106 and may be configured to notify the navigation system of a vehicle of a protruding object condition. Sensors 104 may be generally configured as discussed above, and sensors 104 may be configured to detect both a protruding cargo of an extremity and an object. Accordingly, system 100 may be configured to detect a protruding extremity, object, or both. Such detection of extremities and objects may occur separately, or at the same time, and may be enabled or disabled as a user desires.

In one embodiment, system 100 is integrated into a manually driven car that has a navigation system. Processing circuit 102 is a computing device coupled to the car. Sensors 104 include a wide-field-of-view camera. Processing circuit 102 accepts input from the camera and analyzes the images from the camera to determine when an occupant extends past the boundaries of the car. When a protruding extremity is detected, processing circuit 102 informs the navigation system. The navigation system may use the information to generate an alert or warning. For example, a passenger may extend his arm outside a window of the car as the car is driving. Processing circuit 102 may analyze the camera input to detect the protrusion, and provide related information to the navigation system. The navigation system may generate a visual warning of the condition on its display screen. In another embodiment, sensors 104 include a GPS sensor or augmented-GPS sensor configured to provide a geospatial location. Processing circuit 102 accepts input from the camera and analyzes the images from the camera to determine when a cargo extends past the boundaries of the car, however, the protruding cargo detection is further based on the geospatial location. For example, in a location that is more open (e.g., on an open road), cargo may not be considered protruding, and further action may be suppressed. In a location that is indoors or constricted (e.g., within a garage, in an alley, etc.) the protrusion may be detected and action may be taken.

In one embodiment, system 100 is integrated into a train car. Processing circuit 102 is a computing device coupled to the train car. Sensors 104 include optical sensors. As an example, the optical system may include a transmitter that sends a light beam to a receiver across the width of a window of train car. Upon obstruction of the optical beam by an occupant, processing circuit 102 may determine that the occupant is not properly seated, and therefore has a protruding extremity. Processing circuit 102 informs a navigation system (or a computing/control system) of the train.

In one embodiment, system 100 is integrated into a pickup truck. Processing circuit 102 is a computing device coupled to the truck. Sensors 104 include optical sensors positioned to scan around the perimeter of the bed of the truck. As an example, the optical system may include a transmitter that sends a light beam to a receiver across the width of the bed. Upon obstruction of the optical beam by cargo, processing circuit 102 may determine that the cargo has shifted and is protruding. Processing circuit 102 informs a navigation system of the truck of the condition. Sensors 104 may also include a camera configured to scan an area of a trailer of the truck. Processing circuit 102 accepts input from the camera and analyzes the images from the camera to determine when cargo extends past the boundaries of the trailer. Processing circuit 102 informs a navigation system of the truck of the condition. The scope of the present disclosure is not limited to a certain type of trailer or load, and other objects may be detected as described herein.

In one embodiment, system 100 is integrated into an open bed truck. Processing circuit 102 is a computing device coupled to the truck. Sensors 104 include an RFID (radio-frequency identification) sensor. RFID tags are coupled to cargo of the truck at various locations. For example, if the truck is transporting a load of wood logs, the RFID tags may be coupled to the ends of various logs. Processing circuit 102 receives input from the RFID sensor corresponding to the RFID tags. The RFID sensor may provide distance information to processing circuit 102, or alternatively, processing circuit 102 may calculate a distance of the RFID tag. A distance may be based on a reflected signal strength from the RFID sensor to a particular RFID tag. A distance may also be based on the time it takes for a signal generated by the RFID sensor to reflect from an RFID tag and return to the RFID sensor. In some embodiments, multiple RFID sensors may each measure distances to an RFID tag, and based on the set of multiple distances, processing circuit 102 may determine a 3-D location of the RFID tag. Based on the distance information, processing circuit 102 may determine when cargo corresponding to a particular RFID tag is protruding. Alternatively, processing circuit 102 may determine a protrusion if the RFID sensor data indicates that the RFID tag has crossed a threshold, regardless of distance information. When protruding cargo is detected, processing circuit 102 informs a navigation system of the truck of the condition.

In one embodiment, system 100 is integrated into a car. Processing circuit 102 is a computing device coupled to the car. Sensors 104 include pressure sensors and capacitive sensors integrated throughout the seats of the car, or cameras imaging the interior of the car. Processing circuit 102 receives input from the sensors. Based on the imaging data, pressure data, and/or the capacitive data, processing circuit 102 determines an occupant's position in the car. For example, different parts of the body produce different characteristics with respect to the pressure induced on the seats. By comparing various pressure points and capacitive readings, the position of an occupant's legs, arms, back, etc. may be determined. Processing circuit 102 may also compare the determined position information to skeletal models and estimate that an occupant's extremity is outside the normal contours of the car (e.g., extending out of a window or an open door, etc.). For example, if the pressure and capacitive data indicates that an occupant's arm is resting near the edge of the window, and is directed out of the window, processing circuit 102 may infer that the occupant's hand and forearm are protruding from the window. As another example, if the imaging data from an interior compartment of the car indicates that an occupant's arm is resting near the edge of the window, and is directed out of the window, processing circuit 102 may infer that the occupant's hand and forearm are protruding from the window. When a protruding extremity is detected, processing circuit 102 informs a navigation system of the car of the condition. Similar analysis may be applied to protruding objects.

In one embodiment, system 100 is integrated into a car that has a navigation system including collision avoidance features. The car may be remotely piloted, or automatically/robotically driven by the navigation system. Processing circuit 102 is a computing device coupled to the car. Sensors 104 include multiple wide-field-of-view cameras. Processing circuit 102 accepts input from the cameras and analyzes the images from the cameras to determine when an occupant extends past the boundaries of the car. Processing circuit 102 accepts input from the cameras and also analyzes the images from the cameras to determine when any objects extend past the boundaries of the car. When a protrusion is detected, processing circuit 102 calculates an updated contour of the car to account for the protrusion. The updated contour may include an extended contour corresponding to overall car dimensions, or may be localized to the area of the protrusion. Processing circuit 102 transmits this updated contour information to the navigation system. Processing circuit 102 may format the data related of the updated contour and may communicate with the navigation system according to a protocol defined by system 100 or defined by the navigation system. Processing circuit 102 may transmit a file, various files, or a stream of data to the navigation system. For example, a particular application programming interface (API) may be provided by a navigation system, and processing circuit 102 can be configured to communicate with the navigation system according to the API.

In one embodiment, system 100 is integrated into a car that has a navigation system including collision avoidance features. Processing circuit 102 is a computing device coupled to the car. Sensors 104 include multiple wide-field-of-view cameras. Processing circuit 102 accepts input from the cameras and analyzes the images from the cameras to determine when any cargo extends past the boundaries of the car. When a protrusion is detected, processing circuit 102 analyzes the protrusion to determine details related to the protrusion. For example, processing circuit 102 may determine an amount of a protrusion and a position of the protrusion. Processing circuit 102 may access route information for the vehicle to determine size limits along the route. For example, the navigation system may provide a start and ending destination. As another example, the navigation system may provide a projected route. In one embodiment, the processing circuit compares the route information to a database of size limits to determine size restrictions along the route. In another embodiment, processing circuit 102 directly receives size limit information (e.g., from the navigation system, a database, a mapping program, etc.). The size limit information may be based on a current location of the car or a projected location or route. Processing circuit 102 analyzes and compares the details of the protrusion to the size limit information to determine the susceptibility of the car to the size limit. A size limit may be any size restriction along a route (e.g., a garage size, a tunnel height, a bridge width, a street width, etc.). The analysis may be provided to the navigation system. As an example, the navigation system may utilize the analysis to determine an updated route for the car in the instance that the car and protrusion are too large for a current route due to a size limit.

In one embodiment, system 100 is integrated into a semi-truck having sensors 104, and processing circuit 102 is a computing device coupled to the truck. Processing circuit 102 is configured to receive data relate to protrusions. For example, processing circuit 102 may receive input from a user interface (e.g., a GUI) or an external device. The input data may include dimensions of cargo or a partial arrangement of cargo creating the protrusion. The input data may include a request for updated contour information. Processing circuit 102 informs a navigation system of the truck of the condition. For example, the semi-truck may be carrying a load that cannot fit within the bounds of the bed of the truck, and must be placed in a protruding manner. In this scenario, the truck driver may enter details related to the protrusion via the GUI, or a truck service station may contain sensing equipment that provides related protrusion details to processing circuit 102. Processing circuit 102 accepts the protrusion data and accepts input from sensors 104. Processing circuit may compare the protrusion data to the contours of the truck and inform a navigation system of the truck of the condition. Processing circuit may also generate an updated contour as described herein. Processing circuit may compare may also determine the susceptibility of the truck to a size limit as described herein.

In one embodiment, system 100 is integrated into a truck, however sensors 104 are external to system 100. Sensors 104 may include an array of cameras. For example, the cameras may be positioned at a truck stop weigh station, and scanning may be provided as a service to the truck operator. The truck may drive through the area of the cameras and processing circuit 102 may receive sensor data wirelessly from camera sensors 104. Alternatively, system 100 may be entirely external from the truck, and may be configured to interface with a wireless transmitter to communicate with the navigation system of the truck as the truck is analyzed for protrusions.

Figure 2:
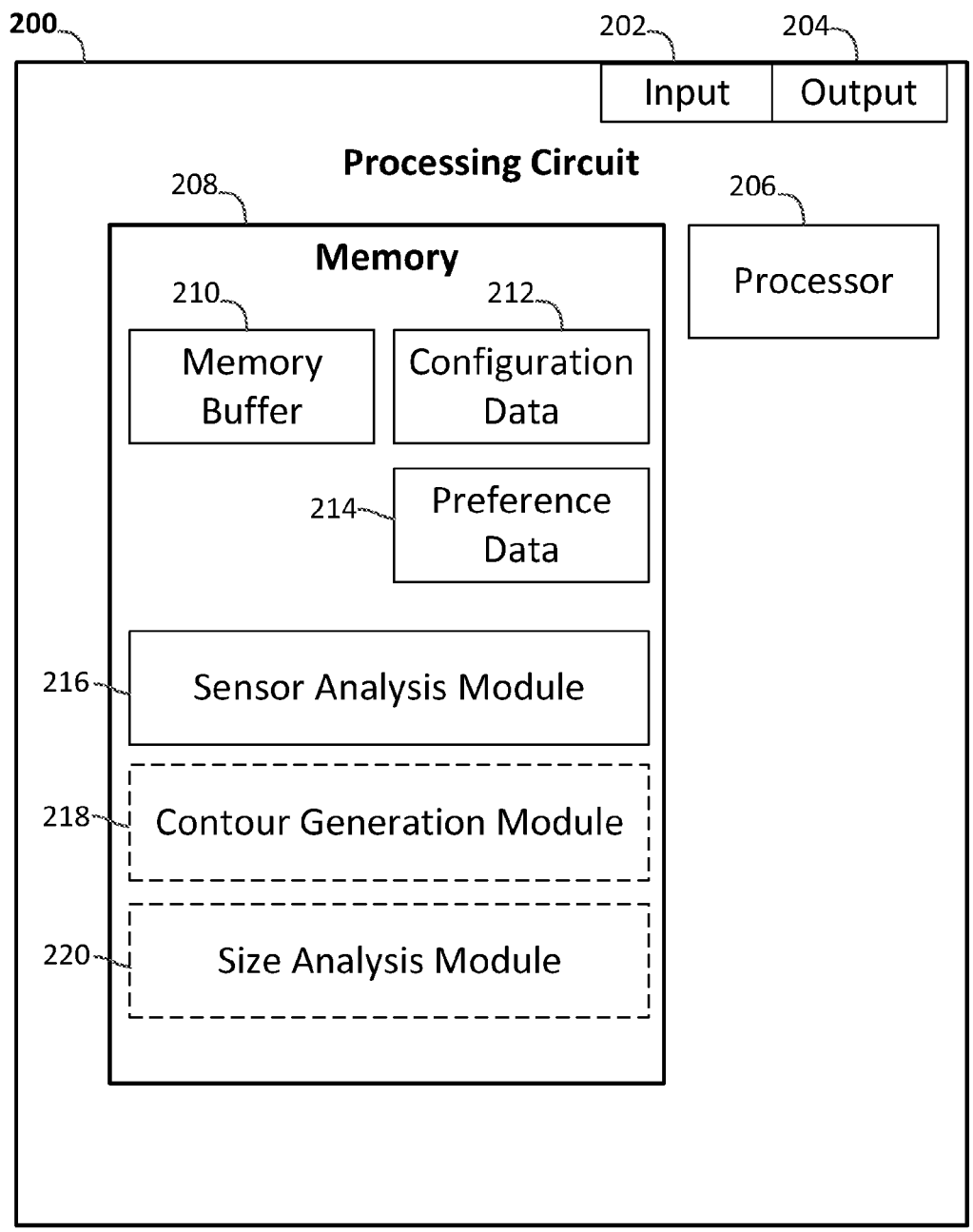
FIG. 2 is a block diagram of a processing circuit according to one embodiment.

Referring to FIG. 2, a detailed block diagram of processing circuit 200 for completing the systems and methods of the present disclosure is shown according to one embodiment. Processing circuit 200 may be processing circuit 102 of FIG. 1. Processing circuit 200 is generally configured to accept input from at least one sensor. Processing circuit 200 is further configured to receive configuration and preference data. Input data may be accepted continuously or periodically. Processing circuit 200 uses the input data to detect when an occupant's body or other cargo extends past the ordinary contour of a vehicle. The ordinary contour is generally based on the dimensions of the particular vehicle (including any trailers/towed items of the vehicle). Processing circuit 200 may automatically detect the ordinary contour of a vehicle, or may receive contour information. For example, a model of the vehicle and/or trailer may be provided by configuration data 212. Processing circuit 200 analyzes data provided by the sensor(s) to determine when an occupant or cargo moves outside of the contour, and is therefore vulnerable to a collision. Based on any detected protrusions, procession circuit 200 may generate and output a warning using a feedback device, or processing circuit 200 may notify a navigation system. Processing circuit 200 may also generate updated contour maps that take into account the space occupied by any protrusions. Processing circuit 200 may also analyze the sensor data related to a protrusion to determine measurements (e.g., height, width, length, etc.) of a protrusion. Processing circuit 200 may also determine the susceptibility of the vehicle to any size limits based on the protrusions. In determining protrusions, generating contours, and determining size limit restrictions, processing circuit 200 may make use of machine learning, artificial intelligence, interactions with local and/or remote databases and database table lookups, pattern recognition and logging, intelligent control, neural networks, fuzzy logic, etc.

According to one embodiment, processing circuit 200 includes processor 206. Processor 206 may be implemented as a general-purpose processor, an application specific integrated circuit (ASIC), one or more field programmable gate arrays (FPGAs), a digital-signal-processor (DSP), a group of processing components, or other suitable electronic processing components. Processing circuit 200 also includes memory 208. Memory 208 is one or more devices (e.g., RAM, ROM, flash memory, hard disk storage, etc.) for storing data and/or computer code for facilitating the various processes described herein. Memory 208 may be or include non-transient volatile memory or non-volatile memory. Memory 208 may include database components, object code components, script components, or any other type of information structure for supporting the various activities and information structures described herein. Memory 208 may be communicably connected to processor 206 and include computer code or instructions for executing the processes described herein.

Memory 208 includes memory buffer 210. Memory buffer 210 is configured to receive a data stream (e.g. from a sensor 104, from a navigation system, from a database, from a user input device, etc.) through input 202. For example, the data may include a real-time stream of sensor data, etc. The data received through input 202 may be stored in memory buffer 210 until memory buffer 210 is accessed for data by the various modules of memory 208. For example, sensor analysis module 216, contour generation module 218, and size analysis module 220 each can access the data that is stored in memory buffer 210.

Memory 208 further includes configuration data 212. Configuration data 212 includes data related to processing circuit 200. For example, configuration data 212 may include information related to interfacing with other components (e.g., sensors of system 100 of FIG. 1, a navigation system of a vehicle, an external database, a user input device, etc.). This may include the command set needed to interface with a computer system used transfer user settings or otherwise set up the system. This may further include the command set needed to generate graphical user interface (GUI) controls, menus, warning information, feedback, and visual information. As another example, configuration data 212 may include the command set needed to interface with communication components (e.g., a universal serial bus (USB) interface, a Wi-Fi interface, an Ethernet interface, etc.). Processing circuit 200 may format data for output via output 204 to allow a user to configure the systems as described herein. Processing circuit may also format visual information to be output for display on a display device. Processing circuit may also generate commands necessary to drive a feedback device. Configuration data 212 may also include information as to how often input should be accepted from a sensor. As another example, configuration data 212 may include default values required to initiate the device and initiate communication with sensors, navigation systems, anti-collision systems, or other peripheral systems. Configuration data 212 further includes data to configure communication between the various components of processing circuit 200.

Processing circuit 200 further includes input 202 and output 204. Input 202 is configured to receive a data stream (e.g., a digital or analog stream of data from sensors), configuration information, and preference information. Output 204 is configured to provide an output to a feedback device, a vehicle navigation system, or components of the systems as described herein.

Memory 208 further includes modules 216, 218, and 220 for executing the systems and methods described herein. Modules 216, 218, and 220 are configured to receive sensor data, configuration information, user preference data, and other data as provided by processing circuit 200. Modules 216, 218, and 220 are generally configured to analyze sensor data, detect a protrusion of a vehicle, provide feedback related to detected protrusions, inform navigation systems of protrusions, generate updated vehicle contours that account for the protrusions, and determine a vehicle's susceptibility to a size limit based on protrusions. Modules 216, 218, and 220 may be further configured to operate according to a user's preferences. In this manner, certain contour characteristics and sensor sensitivities may be adjusted according to a user's desires or manufacturer's settings.

Sensor analysis module 216 is configured to receive sensor data from various sensors (e.g., sensors 104 of FIG. 1, etc.). The sensor data may include distance related data, orientation related data, a range, or 3-D spatial information. The sensor data may be provided through input 202 or through memory buffer 210. Sensor analysis module 216 scans the sensor data and analyzes the data to detect the position of cargo of a vehicle. The cargo may include an occupant, a pet, or other objects. Upon detection of cargo, sensor analysis module 216 may determine whether the cargo is a living occupant or is an object. Based on that determination, for occupants and pets, sensor analysis module 216 may further determine a particular type of extremity (e.g., arm, leg, foot, head, hand, paw, etc.) that is protruding. Sensor analysis module 216 may also scan and analyze the sensor data to detect types of objects (e.g., a cane, skis, wood, etc.). In one embodiment, sensor analysis module 216 scans to automatically detect all cargo within the sensor data. In another embodiment, sensor analysis module 216 analyzes the sensor data for certain types of cargo. The types of cargo may be provided by configuration data or user setting data. Additionally, various models of cargo may be accessed in detecting an object. Sensor analysis module 216 compares the positioning of an occupant and extremities to the contour of the vehicle. Sensor analysis module 216 also compares the positioning of the objects to the contour of the vehicle. The contour generally corresponds to the dimensions of the area of space taken up by the vehicle (e.g. a maximum length and width, etc.). For example, a particular car model may have a footprint that is 6 ft. wide by 15 ft. long. As another example, a particular truck (including a trailer) may have a footprint that is 8 ft. wide by 50 ft. long. The contour in these situations may correspond to the perimeter around the space taken up by the footprint. In the case of a vehicle having a trailer, the contour may change as the vehicle moves (e.g., as the truck turns). A contour may be precisely specified to correspond to all changes in dimensions of the vehicle, or may be a more general square/rectangle shape corresponding to the maximum dimensions occupied by the vehicle. As another example, a particular vehicle may have a footprint that is 6 ft. wide by 15 ft. long, but may have a tapered shape such that the width of the vehicle is 6.5 ft. at the steering wheel level due to side-view mirrors. The contour in this scenario may correspond to the length and the width at the steering-wheel level, as opposed to the width at the footprint of the wheelchair. The contour of a vehicle may either be provided by pre-stored vehicle profiles or contours (e.g., stored in configuration data, etc.), may be based on vehicle model data, or may be detected by sensor analysis module 216. Sensor analysis module 216 may utilize typical boundary detection algorithms in determining the contour of a vehicle.

Sensor analysis module 216 may determine that cargo is outside of the vehicle contour through a variety of methods. A particular method may correspond to the type of sensors in use. Any of the methods of detection discussed herein may be combined or used individually. For example, in one embodiment utilizing a wide-field-of-view camera, sensor analysis module 216 receives image data. Sensor analysis module 216 analyzes the image data to detect an occupant's position using body detection algorithms and object's position using object detection algorithms. As the body of the occupant is detected, sensor analysis module 216 also compares the location of the extremities to the contour of the vehicle. If an extremity is determined to be outside of the contour, then sensor analysis module 216 provides this information to contour generation module 218, size analysis module 220, or both. Similar analysis may be performed for an object. Typically, when an extremity or object is outside of the contour, it is at risk of collision. However, the amount that an extremity or object must be outside the contour before it is considered a risk may be adjusted (e.g., through thresholds stored in configuration data 212 or preference data 214.). In this manner, a driver, occupant, or manufacturer may customize the particular system in use such that a threshold must be reached before the system updates contour values or performs further analysis. In one embodiment, sensor analysis module 216 receives geospatial information from a GPS sensor, and analyzes the geospatial information in determining a protruding extremity. In this manner, the location of the vehicle may be used in determining distance thresholds that must be reached before the system considers an extremity or object as protruding. Any data generated by sensor analysis module may be provided to any of the modules of processing circuit 200.

In one embodiment utilizing optical/laser link sensors, sensor analysis module 216 receives data related to cargo (e.g., objects and extremities, etc.) crossing the path of the optical/laser links. For example, if the optical links are arranged around the perimeter of the openings of a vehicle (doorways, windows, tailgates, etc.), the sensors may provide a signal to sensor analysis module 216 when the occupant's leg crosses the optical link and protrudes outside the contour of the vehicle. Such optical systems may be used in conjunction with other sensors described herein. For example, after an optical link sensor is triggered, a camera sensor may be used to determine an amount of a protrusion through analysis of image data provided by the camera sensor. As another example, capacitive and pressure sensors may be used to determine the general position of an occupant in the vehicle. Such pressure and capacitive sensors may be mounted in the seat and the backrest areas of the vehicle. Sensor analysis module 216 may analyze the position data and compare it to models of the human body (e.g., skeletal models, etc.) and estimate an amount that an extremity is protruding based on knowledge of body interconnectivity (e.g., the hand is connected to the forearm, etc.). The models of the human body may be general models according to average human proportions, or may be tailored to the dimensions of a particular occupant. Such models may be stored in configuration data 212 or preference data 214. In some embodiments, sensor analysis module 216 may be configured to infer protrusions based on pressure or capacitive data alone.

In one embodiment utilizing sensors coupled to the cargo, sensor analysis module 216 may monitor sensor data for indications that the cargo has moved beyond the safe contours of the vehicle. For example, an RFID sensor system may be mounted throughout the perimeter of the vehicle (an any accompanying trailer), and the cargo may have RFID tags coupled to it. If the RFID tag crosses the bounds of the RFID sensor system, the RFID system can provide appropriate data to the sensor analysis module 216, which may then determine that the cargo is protruding. For an occupant, such RFID tags may be coupled to an occupant's wrist (with a wristband) or ankles, etc. The protrusion determination may be may in conjunction with knowledge of the occupant's body position as discussed above, or may be dependent solely on the RFID tag crossing the RFID sensor. Additionally, some RFID sensor systems are capable of determining a distance from an RFID tag as discussed above. Such distance information may be utilized by sensor analysis module 216 in determining the amount of a protrusion.

In one embodiment utilizing sensors coupled to the cargo, sensor analysis module 216 may monitor sensor data for indications that the cargo has moved beyond the safe contours of the vehicle. For example, a radar or lidar sensor system may be mounted on the vehicle (or any accompanying trailer), and the cargo may have radar or lidar reflectors coupled to it. In some embodiments, the radar or lidar reflectors are retroreflectors, such as cornercubes. In the case of cargo that is a pet, such reflectors may be coupled to the pet's collar. For an elongated object, such as a pipe or board, the reflectors may be coupled near the tip. The protrusion determination may be in conjunction with knowledge of a model of the object or occupant as discussed above, or may be dependent solely on the radar or lidar sensor's detection of the protruding cargo or a reflector coupled to it. The radar or lidar sensor may be solely provided for protrusion detection, or may also be used by the vehicle's collision avoidance or navigation system for sensing external vehicles or obstacles.

In one embodiment utilizing infrared sensors, sensor analysis module 216 may analyze heat map data corresponding to the heat signature of cargo. Sensor analysis module 216 scans the heat map to determine the locations of the cargo with respect to the vehicle, and then compares the locations to the contour of the vehicle. If an extremity is determined to be extending beyond the contour, sensor analysis module 216 may determine that the cargo is protruding, and thus further action may be taken. Sensor analysis module 216 may also analyze the heat map to determine specific or estimated amounts that cargo is protruding.

In one embodiment, a system including processing circuit 200 is configured to interface with and accept input, via input 202, from onboard sensors (or onboard computing systems) of a vehicle. Sensor analysis module 216 analyzes the data to infer a dynamic protrusion or potential for a dynamic protrusion (e.g., due to slipped or shifted cargo). For example, a truck may include diagnostic systems for monitoring pressure at its wheels. If the provided data suddenly indicates that the pressure distribution between wheels has shifted, or increased at a certain wheel, sensor analysis module 216 may infer that cargo has shifted in a manner as to be potentially protruding or actually protruding. As another example, if the provided data indicates that there is a sudden decrease in speed, sensor analysis module 216 may infer that cargo may shift due to momentum of the cargo and the decrease in vehicle speed. As another example, if the data indicates that a window or door of the vehicle is opened while the vehicle is moving, sensor analysis module 216 may infer that there is a likelihood that an occupant may shift to a protruding position (e.g., place an arm outside the window). In another embodiment, the sensors of the system (e.g., sensors 104) include the sensors necessary to monitor vehicle conditions (e.g., load sensors, pressure sensors, speedometers, etc.). as discussed. In any of these scenarios, sensor analysis module 216 may provide inference data to contour generation module 218 to generate an inferred updated contour. Default values, configuration data, or models of the cargo may be used in estimating an updated contour.

Contour generation module 218 receives data from sensor analysis module 216 related to a protrusion, and notifies a navigation system of a vehicle of the protrusion. For example, robotically driven vehicle may include a navigation system with anti-collision features. Such an anti-collision system may use radar, or other means, to scan a road to detect obstacles and measure the width (or lane width/position) of the road. Such an anti-collision system may also obtain the road details from an externally supplied map or database or from geospatial information. A GPS sensor of the navigation system or a GPS sensor that is part of the systems described herein may also provide the geospatial information. Generally, based on the contour (e.g., the width, etc.) and orientation of the vehicle, a navigation and anti-collision systems may safely steer the vehicle within a lane of the road. Contour generation module 218 generates appropriate signals to communicate with such navigation systems. In this manner, contour generation module 218 may notify the navigation system that cargo of the vehicle is outside the ordinary contours of the vehicle, and the navigation system may take appropriate action (e.g., pausing the movement of the vehicle, changing the route of the vehicle, changing the position within a lane, allowing for additional space on turns, allowing for additional space between other traffic, etc.). Contour generation module 218 may also inform the navigation system that the vehicle should be treated as having an updated contour due to the space taken up by a protruding object. In some embodiments, contour generation module 218 generates an updated contour that takes the protrusion into account, and provides the updated contour to the navigation system. In doing so, contour generation module 218 may access vehicle contour data stored in configuration data 212 or as generated by sensor analysis module 216, as discussed above. In this manner, the navigation system and anti-collision mechanisms of the vehicle may dynamically adjust the values used related to space occupied by the vehicle to compensate for the additional space taken by the protruding cargo. For example, after receiving updated contour data from contour generation module 218, the navigation system may treat a vehicle as being 7 ft. wide, as opposed to an ordinary width of 6 ft., and thus, the navigation system may safely steer the vehicle to avoid collisions with the protruding cargo (e.g., an extremity and/or object). As another example, after receiving updated contour data from contour generation module 218, the navigation system may treat a truck as being 25 ft. long, as opposed to 20 ft. long, and thus, the navigation system may safely steer the truck to avoid collisions. As another example, after receiving updated contour data from contour generation module 218, the navigation system may treat a truck as being 9 ft. high, as opposed to an ordinary height of 6 ft., and thus the navigation system may safely steer the truck or calculate an updated route to avoid overhead collisions. Updated contours may include updates in any of three-dimensions, collectively or separately.

In one embodiment, contour generation module 218 updates a contour across an entire span of the vehicle. For example, if contour generation module 218 receives data from sensor analysis module 216 that indicates an occupant's arm is extended beyond the right-side boundary of the vehicle by 10 inches, contour generation module 218 may extend the width of the vehicle to the right side by 10 inches. As another example, if contour generation module 218 receives data from sensor analysis module 216 that indicates an item of cargo is extended beyond the right-side boundary of a trailer of the vehicle by 2 feet, contour generation module 218 may extend the width of the contour to the right side (along the span of the vehicle and trailer) by 2 ft. Contour generation module 218 may add additional buffer space to the contour for additional safety (e.g., extending the right-side boundary by 2.5 ft. instead of 2 ft. as in the previously discussed examples).

In one embodiment, contour generation module 218 updates a contour in a localized manner. For example, if contour generation module 218 receives data from sensor analysis module 216 that indicates an occupant's arm is extended beyond the left-side boundary of the vehicle by 10 inches, contour generation module 218 may extend the width of the contour area around the extended arm by 10 inches, but not change the contour in other regions, such as above or behind the extended foot. As another example, if contour generation module 218 receives data from sensor analysis module 216 that indicates an item of cargo is extended beyond the left-side boundary of the vehicle by 25 inches, contour generation module 218 may extend the width of the contour area around the cargo by 25 inches, but not change the contour in other regions, such as in front or in back of the cargo. As another example, if contour generation module 218 receives data from sensor analysis module 216 that indicates an item of cargo is extended beyond the right-side boundary of a trailer of the vehicle, by 2 ft., contour generation module 218 may extend the width of the contour to the right side (along the span of trailer, but not the vehicle) by 2 ft. Contour generation module 218 may add additional buffer space to the contour for additional safety.

In one embodiment, contour generation module 218 receives data related to an inferred protrusion from sensor analysis module 216. The data may include positions of the inferred protrusion, estimated protrusion amounts, models of cargo inferred to be protruding. Contour generation module 218 may generate updated contours as discussed above (e.g., generally or localized) but based on the inferred data. Also, contour generation module 218 may access default or configuration values related to updated contours. For example, upon receiving inferred protrusion data from sensor analysis module 216, contour generation module 218 may access default values specifying to increase the overall contour of the vehicle by a certain percentage or amount (e.g., 20% overall increase, or an addition of 2 ft., etc.). As another example, the default values may depend on the position of the inferred protrusion, and may specify an extension to a certain portion of the contour by a percentage or amount.

In one embodiment, contour generation module 218 is configured to format update contour data for transmission. In this manner, processing circuit 200 may interface with a transmitter (e.g., a radio transmitter, a Bluetooth transmitter, a Wi-Fi transmitter, etc.) to provide an updated contour to the navigation system of another nearby vehicle. Alternatively, an updated contour may be transmitted to an accessible database (e.g., associated with the car, the driver, an insurance company, a government agency, a mapping service, etc.). By doing so, other vehicles equipped with navigation systems may access the database (e.g., using the vehicle's license plate as an identification code) to obtain updated contour information of the vehicle (and other nearby traffic) as the vehicles are navigating.

Size analysis module 220 receives data from contour generation module 218 related to a protrusion and an updated contour of a vehicle, and analyzes the dimensions of the updated contour to determine if the vehicle is susceptible to a size limit along its route (or potential route). For example, the dimensions of the updated contour may include the amount of an extension, or a height of a protrusion. In one embodiment, size analysis module 220 accesses a database (local or remote) to determine a size limit on a route of the vehicle, or based on the current location of the vehicle. For example, in an embodiment having sensors 104 that include a GPS sensor, size analysis module 220 may receive a geospatial location of the vehicle from sensors 104. For remote size limit or mapping databases, processing circuit 200 may interface with a transmitter as described above to obtain the relevant data. The database may be provided by a mapping provider or mapping application. In another embodiment, a size limit and/or projected route is provided by a navigation system of the vehicle. The navigation system may include automatic guidance and anti-collision systems as described herein. In another embodiment, a route is entered by a graphical user interface in communication with processing circuit 200. A size limit may refer to any height, width, or length restriction (e.g., a vertical or horizontal clearance). For example, an overpass/underpass or garage/structure may have a 12 foot vertical clearance requirement for the vehicle to safely fit. For example, different traffic lanes of a structure may have different size (e.g., height or width) restrictions. Size analysis module 220 may compare a height measurement related to an updated contour to a height limit. As another example, a road or alley may have a maximum navigable width of 7 ft. Size analysis module 220 may compare length and width measurements related to an updated contour to a horizontal clearance. Based on a route of the vehicle, size analysis module 220 may determine the potential for collisions and susceptibility to size limits on the route. Size analysis module 220 may compare the dimension of the updated contour (as caused by protruding cargo) to determine if the vehicle may safely navigate the route, or would likely be obstructed by a size restriction. Upon determining that the vehicle would be susceptible to a size limit, size analysis module 220 may notify the navigation system of the vehicle of the condition and provide relevant data (e.g., the size limit, a location of the size limit, lane dependent restrictions, the updated contour and its dimensions, etc.). As an example, the navigation system may use the notification and provided data to determine an alternate route. In some embodiments, upon determining that the vehicle would be susceptible to a size limit, size analysis module 220 may notify the structure posing the size limit of the vehicle's approach and the impact susceptibility.

In one embodiment, a structure having a size restriction may (e.g., via a computing device and a detector/sensor) identify an incident vehicle, access its contour from a database, and determine an impact susceptibility. For example, the make or model of the vehicle may be identified (e.g., by an optical recognition algorithm using camera data), and its nominal contour determined from a manufacturer's database. The make or model information may be used to access the correct information in the database. The structure may also request an updated contour to be provided by the vehicle. In response, the vehicle may transmit the updated contour information to the database, or directly to the structure. In another example, a more specific identification of the vehicle may be determined, such as by imaging its license plate, by electronically reading a vehicular RFID tag, or by using a radio antenna to communicate with a radio transponder (e.g., a Fast-Pass/electronic toll pass type electronic identifier, etc.). The specific identification (e.g., license plate number, RFID information, transponder information, etc.) may be used to access the correct information in the database including the contour information (e.g., as a unique database key or ID, etc.). The detector/sensors used to identify the incident vehicle may be located at/near the structure, or may be located some distance in front of it (e.g., ½ mile away on an approaching road, etc.). The contour information (which may or may not reflect the effect of protrusions beyond the vehicle's nominal contour) may be located in a database on the vehicle itself, or in an external database. For example, the database may belong to the vehicle's owner (e.g., as identified via driver registration records). As another example, the database may be maintained by a government agency, by a website, by the vehicle's insurance company, or by the structure's owner (e.g., for vehicles anticipated or authorized to use it), and/or may be accessible via a network connection. The contour information may include timing information indicating when it was last updated, or for what date or time-period the information is valid for. Based on the contour (or updated contour) information and the dimensions of the structure, if the structure determines the incident vehicle poses an impact susceptibility, it can initiate various responses. In one example, it can warn the vehicle or driver. This notification can be made electronically (e.g., to the vehicle's navigation system, to an in-vehicle display, etc.), audibly (e.g., a buzzer, vocal instructions, etc.), or visually (e.g., a red/green light, a message on a display screen, etc.). The notification may provide instructions to the vehicle on how to safely navigate the structure (e.g., which lane to use, etc.). The existence of the notification may be logged (e.g., in a database) for liability (e.g., criminal or financial, etc.) purposes. In another example, the structure may initiate protective measures, such as emplacing a barrier to block access by the vehicle, or deploying external bumpers or airbags. In some examples, the structure may notify third parties, such as emergency personnel, nearby vehicles, or the like, of the impact risk.

Figure 3A:
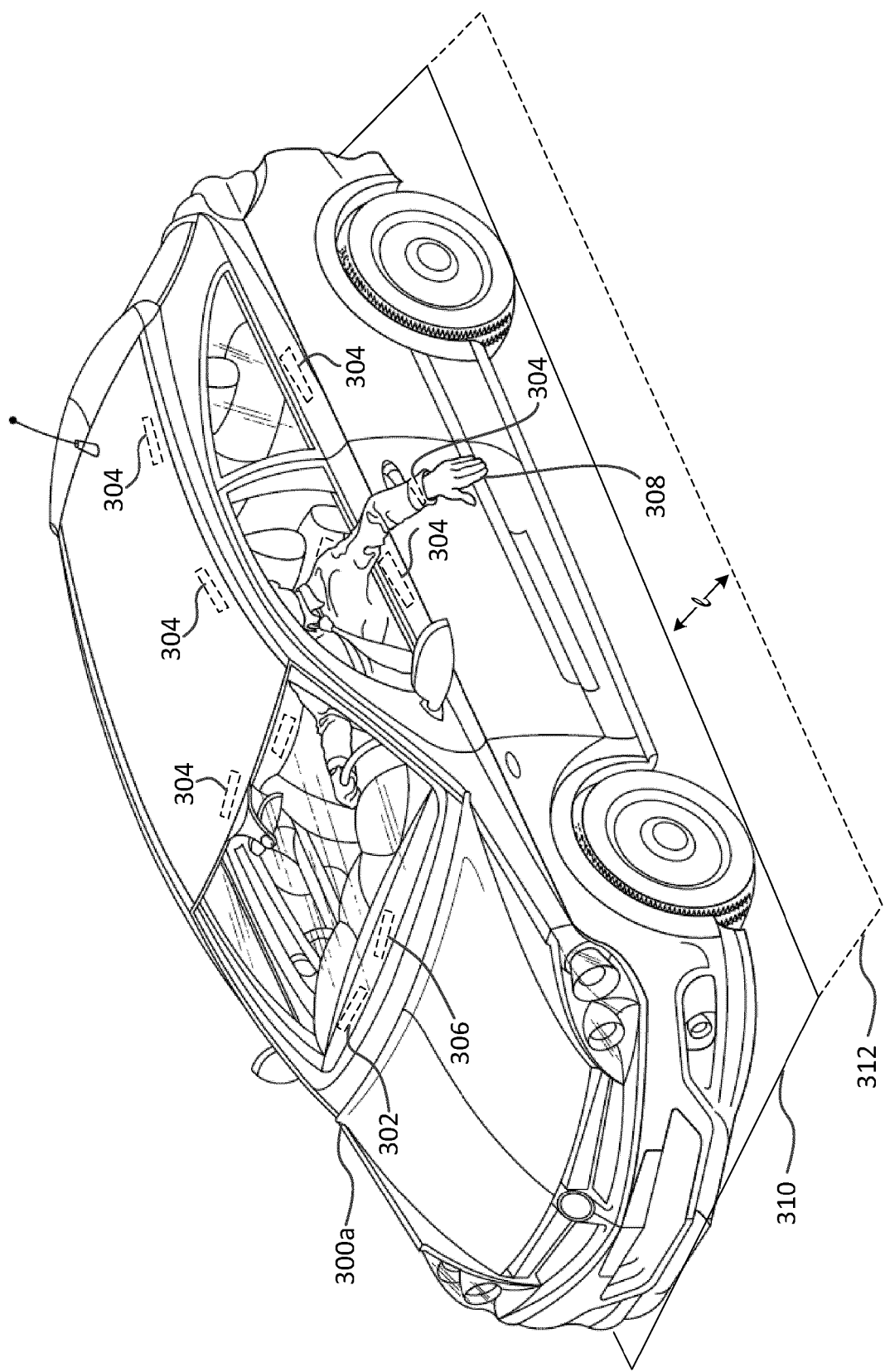
FIG. 3a is a schematic diagram of a vehicle according to one embodiment.

Referring to FIG. 3a, a schematic of car 300a is shown according to one embodiment. Car 300a is equipped with the systems described herein and includes processing circuit 302, and sensors 304 integrated in various locations. For example, sensors 304 may include optical sensors configured to scan across the window area. Sensors 304 may include cameras affixed to the front and back of roof of car 300a. Sensors 304 may include pressure sensors and capacitive sensors integrated into the seat and window sill areas. In one embodiment, sensors 304 may include an RFID sensor and driver 308 may be wearing an RFID tag wristband. Any combination of sensors described herein is envisioned. Car 300a further includes navigation system 306 having anti-collision features. The left arm of driver 308 is depicted as protruding beyond the left boundary of contour 310. Sensors 304 provide sensor data to processing circuit 302, which detects the protruding extremity and compares it to contour 310. Processing circuit 302 calculates the amount l that the arm of driver 308 is protruding and generates updated contour 312 to include the additional space occupied by the protruding arm. The width of contour 310 is depicted as being updated along the entire left span of car 300a. Updated contour 312 also includes the areas of contour 310 that were unaffected by the protruding arm. Updated contour 312 is provided to navigation system 306.

Figure 3B:
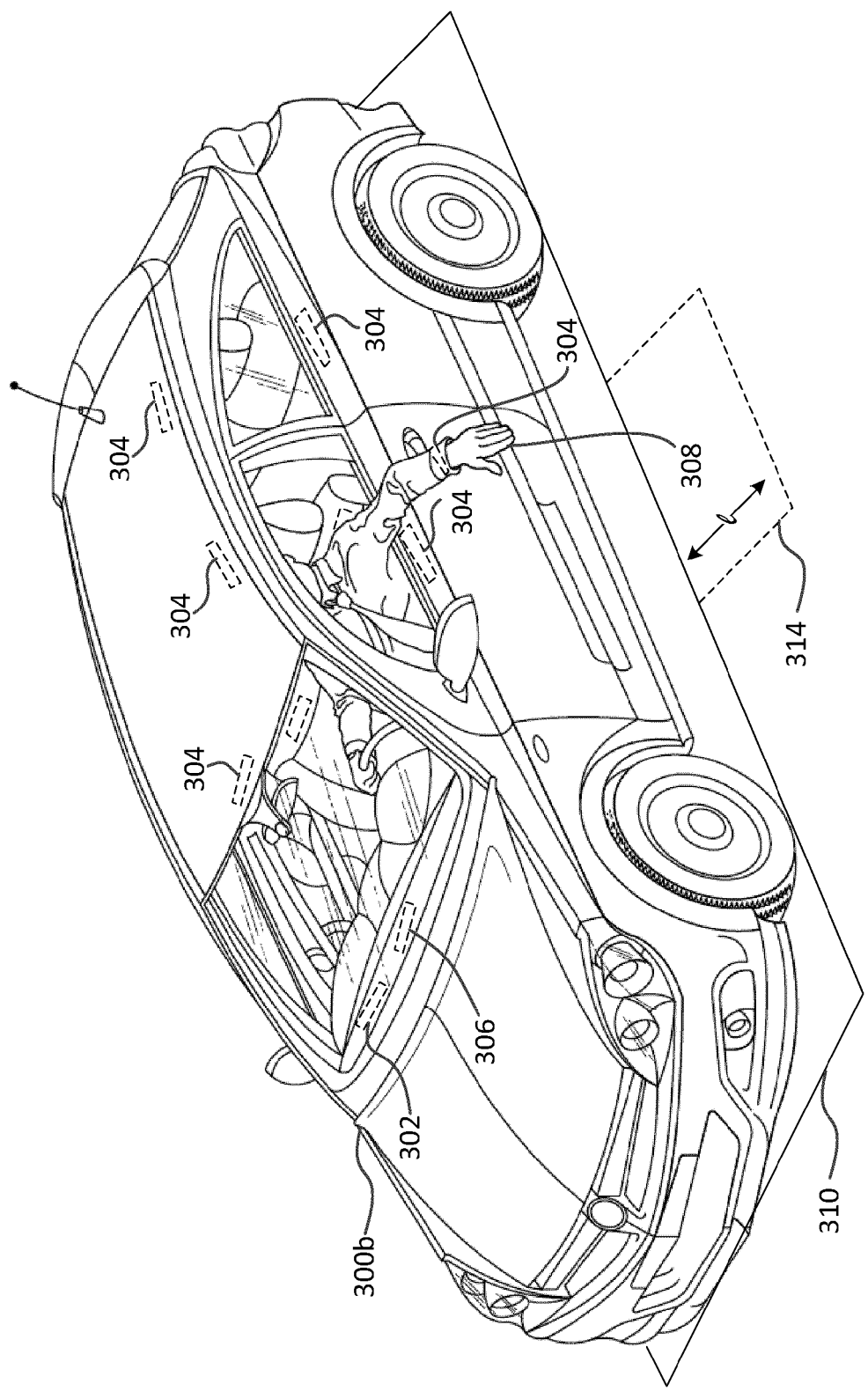
FIG. 3b is a schematic diagram of a vehicle according to one embodiment.

Referring to FIG. 3b, a schematic of car 300b is shown according to one embodiment. Car 300b is equipped with the systems described herein and is similar to car 300a. Car 300b includes processing circuit 302, however, processing circuit 302 of car 300b is configured to generate locally updated contours. Car 300b includes sensors 304 coupled to car 300b in various locations. Sensors 304 may include any of the sensors described herein. Processing circuit 302 calculates the amount l that the arm of driver 308 is protruding and generates updated contour 314 to include the additional space occupied by the protruding arm. Contour 310 is depicted as being updated locally, only around the area of the protruding arm. Updated contour 314 also includes the areas of contour 310 that were unaffected by the protruding extremity. Updated contour 314 is provided to navigation system 306.

Figure 3C:
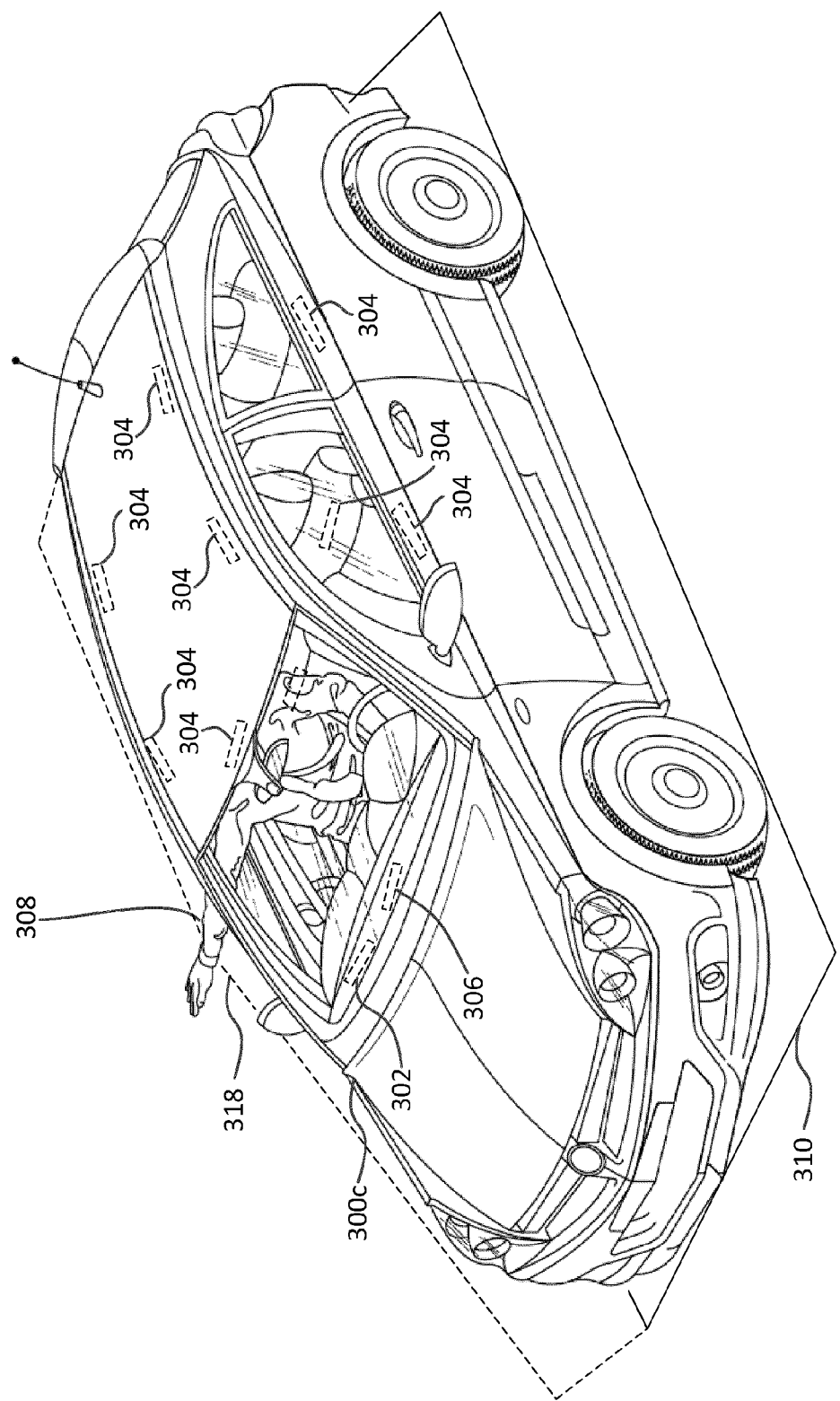
FIG. 3c is a schematic diagram of a vehicle according to one embodiment.

Referring to FIG. 3c, a schematic of robotically driven car 300c is shown according to one embodiment. Car 300c is equipped with the systems described herein and is similar to car 300a. Car 300c includes processing circuit 302 and sensors 304. Navigation system 306 is capable of driving car 300c and includes automatic guidance systems and anti-collision systems. Processing circuit 302 calculates the amount that the arm of driver 308 is protruding and generates updated contour 312 to include the additional space occupied by the protruding arm. The width of contour 310 is depicted as being updated along the entire right span of car 300c, although in another embodiment, the contour may be updated locally. Updated contour 318 is provided to navigation system 306, which may be used the updated contour as it drives car 300c and avoids collisions. In one embodiment, car 300c may be configured to be remotely piloted (e.g., via a remote control).

Figure 4:
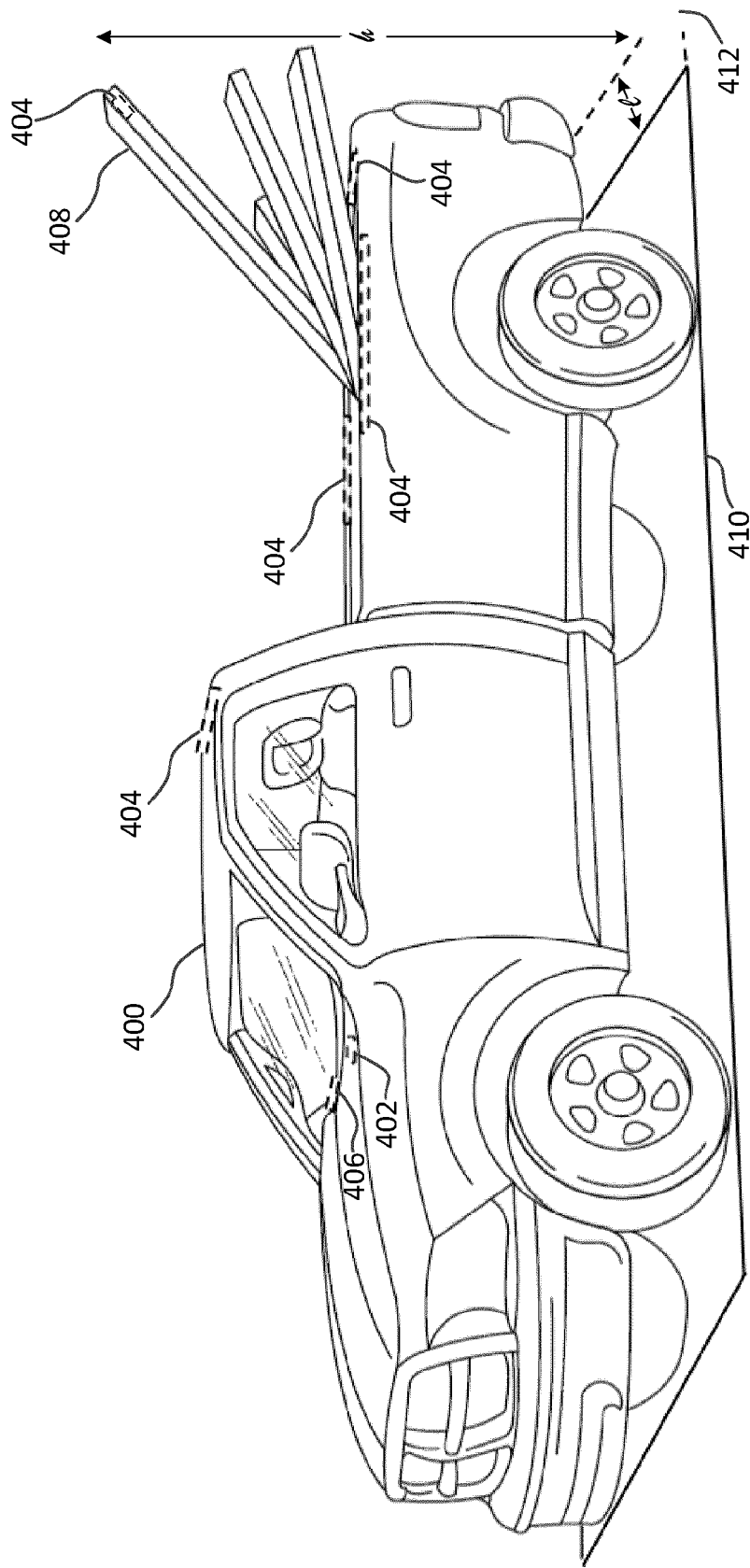
FIG. 4 is a schematic diagram of a vehicle according to one embodiment.

Referring to FIG. 4, a schematic of truck 400 is shown according to one embodiment. Truck 400 is equipped with the systems described herein and includes processing circuit 402, and sensors 404 integrated in various locations. For example, sensors 404 may include cameras configured to scan across the truck bed area. Sensors 404 may also include a wide angle camera affixed to the roof of truck 400. Truck 400 further includes navigation system 406 including anti-collision features. Truck 400 may be manually driven, remotely controlled, or may be robotically driven by an automatic guidance system of navigation system 406. In one embodiment, sensors 404 may include an RFID sensor and an RFID tag may be coupled to the end of cargo 408 (e.g., wood). The ends of cargo 408 are depicted as protruding beyond the rear boundary of contour 410. Sensors 404 provide sensor data to processing circuit 402, which detects the protruding cargo 408 and compares it to contour 410. Processing circuit 402 calculates the amount l that cargo 408 is protruding and generates updated contour 412 to include the additional space occupied by the protruding cargo. The width of contour 410 is depicted as being updated along the entire rear span of truck 400, although, it may be also updated locally as described herein. Updated contour 412 also includes the areas of contour 410 that were unaffected by the protruding cargo 408. Updated contour 412 is provided to navigation system 406.

Processing circuit 402 is further configured to determining the susceptibility of the truck 400 to a size limit based on updated contour. For example, processing circuit 402 may receive route and size limit information from navigation system 406. In another embodiment, processing circuit 402 may access a database of size limit information for or interface with a mapping application to determine a size limit. Based on the data from sensors 404, processing circuit 402 calculates the height h that cargo 408 is extending. Processing circuit 402 compares height h to a size limit (e.g., a vertical clearance of a bridge or garage, etc.) to determine if truck 400 is susceptible to the size limit or can safely navigate the size limit. In the event that processing circuit 402 determines that height h is greater than the size limit, processing circuit 402 notifies navigation system 406 of the condition.

Figure 5:
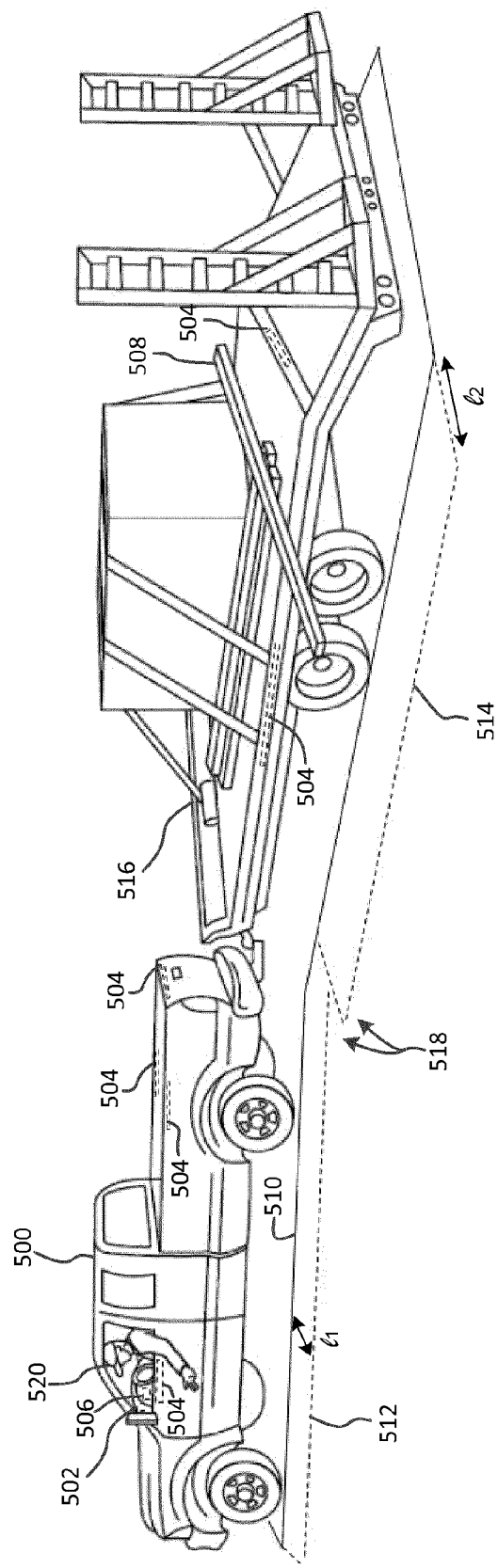
FIG. 5 is a schematic diagram of a vehicle according to one embodiment.

Referring to FIG. 5, a schematic of truck 500 is shown according to one embodiment. Truck 500 is equipped with the systems described herein and includes processing circuit 502, and sensors 504 at various locations. For example, sensors 504 may include cameras configured to scan across the truck bed area. Sensor 504 may include pressure and capacitive sensors integrated into the seat of truck 500. Truck 500 is connected to trailer 516, which is also equipped with sensors 504. Sensors 504 of trailer 516 may include any of the sensors described herein. For example, trailer sensors 504 may include RFID sensors and RFID tags coupled to cargo 508. Truck 500 further includes navigation system 506 including anti-collision features. Truck 500 may be manually driven, remotely controlled, or may be robotically driven by an automatic guidance system of navigation system 506. In one embodiment, trailer sensors 504 may be configured to wirelessly communicate with processing circuit 502. One of the ends of cargo 508 is depicted as protruding beyond the left boundary of contour 510. Additionally, the arm of driver 520 is depicted as extended beyond the left boundary of contour 510. Contour 510 generally includes the dimensions and footprint of truck 500 and trailer 516. Sensors 504 provide sensor data to processing circuit 502, which detects the protruding arm and the protruding cargo and compares it to contour 510. Processing circuit 502 calculates the amount $l_1$ that the arm is protruding and generates updated contour 512 to include the additional space occupied by the protruding arm. Processing circuit 502 calculates the amount $l_2$ that the cargo is protruding and generates updated contour 514 to include the additional space occupied by protruding cargo 508. The width of contour 510 is depicted as being updated to include the dimensions of updated contour 512 and updated contour 514 to form an overall updated contour 518. In one embodiment, in the case of multiple protrusions, processing circuit 502 may extend a single updated contour to compensate for all protrusions. For example, if amount $l_2$ is greater that amount $l_1$, processing circuit 502 may extend contour 510 along the entire span of truck 500 and trailer 516 by amount $l_2$. In another embodiment, processing circuit 502 may update contour 510 in a localized manner for each protrusion as described herein. Updated contour 518 also includes the areas of contour 510 that were unaffected by the protruding arm and protruding cargo 508. Updated contour 518 is provided to navigation system 506.

Processing circuit 502 is further configured to determining the susceptibility of the truck 500 to a size limit based on updated contour 518. For example, processing circuit 502 may receive route and size limit information from navigation system 506. Processing circuit 502 compares amounts $l_1$ and $l_2$ to a size limit (e.g., a width clearance of a road, etc.) to determine if truck 500 and trailer 516 are susceptible to the size limit or can safely navigate the size limit. In the event that processing circuit 502 determines that amounts $l_1$ or $l_2$ are susceptible to the size limit, processing circuit 502 notifies navigation system 506 of the condition.

Figure 6:
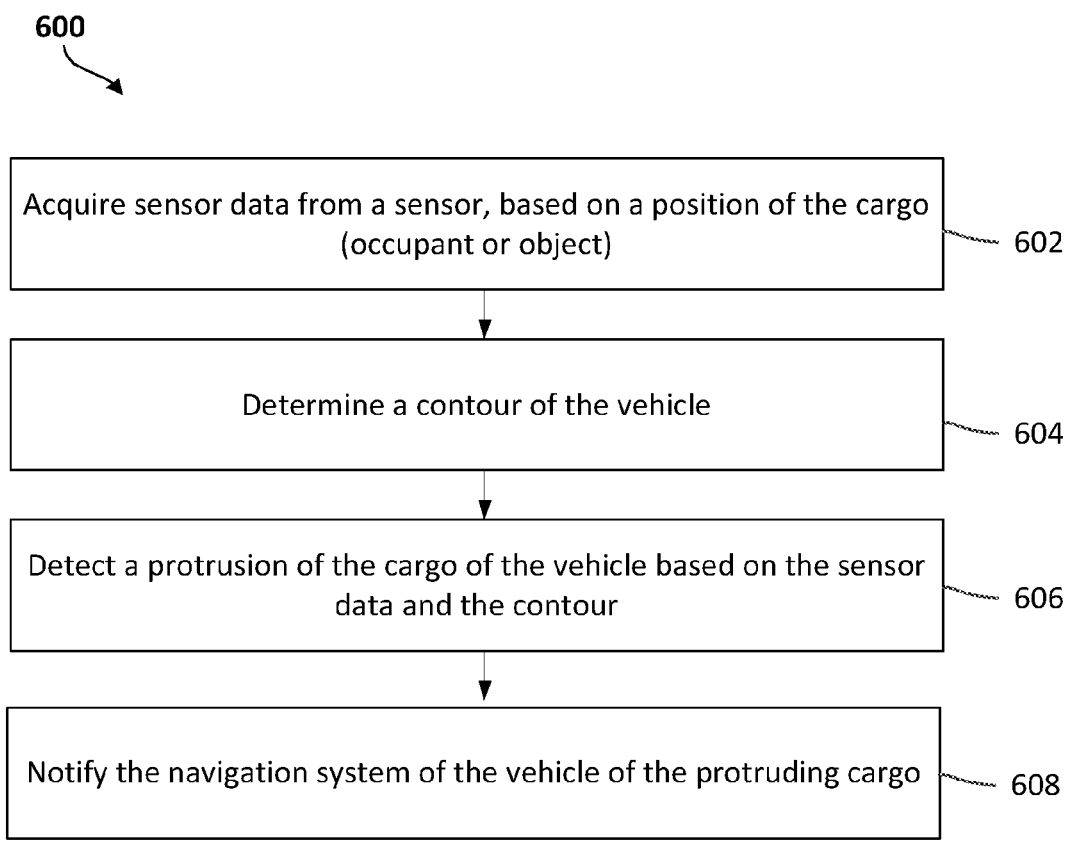
FIG. 6 is a flowchart of a process for informing a navigation system of a vehicle of a protrusion according to one embodiment.

Referring to FIG. 6, a flow diagram of a process 600 for informing a navigation system of the vehicle of the protruding cargo is shown, according to one embodiment. In alternative embodiments, fewer, additional, and/or different actions may be performed. Also, the use of a flow diagram is not meant to be limiting with respect to the order of actions performed. Sensor data is acquired from a sensor, where the sensor data is generally based on a position of the cargo of the vehicle (602). The sensor may be on-board the vehicle or may be external to it. The cargo may include an occupant(s) or object(s). The contour of the vehicle (including any trailers, etc.) is determined (604). The sensor data and contour is analyzed to detect a protrusion (606). If a protrusion is detected, then the navigation system of the vehicle is notified (608). Data may be formatted and sent to the navigation system according to the specifications of the particular vehicle.

Figure 7:
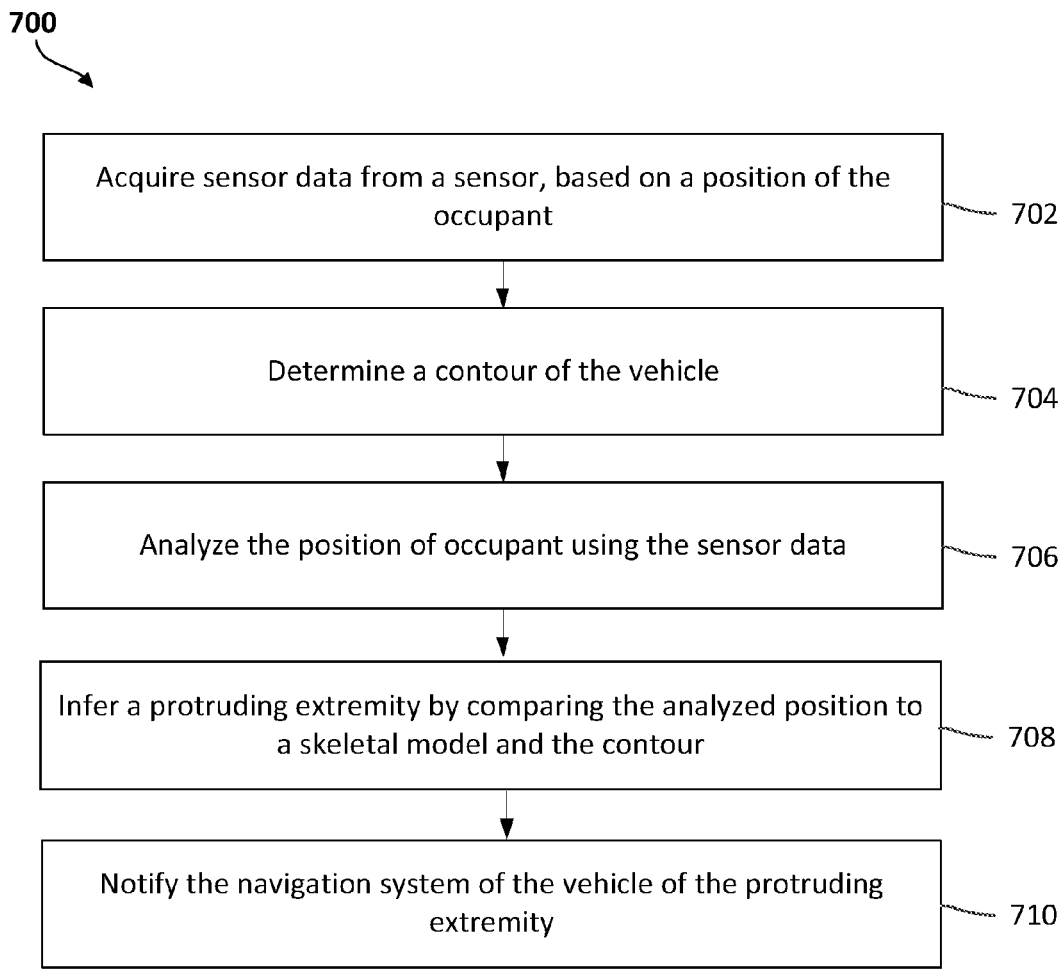
FIG. 7 is a flowchart of a process for informing a navigation system of a vehicle of a protrusion according to one embodiment.

Referring to FIG. 7, a flow diagram of a process 700 for informing a navigation system of the vehicle of the protruding cargo is shown, according to one embodiment. In alternative embodiments, fewer, additional, and/or different actions may be performed. Also, the use of a flow diagram is not meant to be limiting with respect to the order of actions performed. Sensor data is acquired from a sensor (702), where the sensor data is generally based on a position of the occupant. The contour of the vehicle is determined (704). The position of the occupant in the vehicle is analyzed using on the sensor data (706). A protruding extremity is estimated or inferred by comparing the analyzed position to a skeletal model and the contour (708). If a protruding extremity is inferred, then the navigation system of the vehicle is notified (710).

Figure 8:
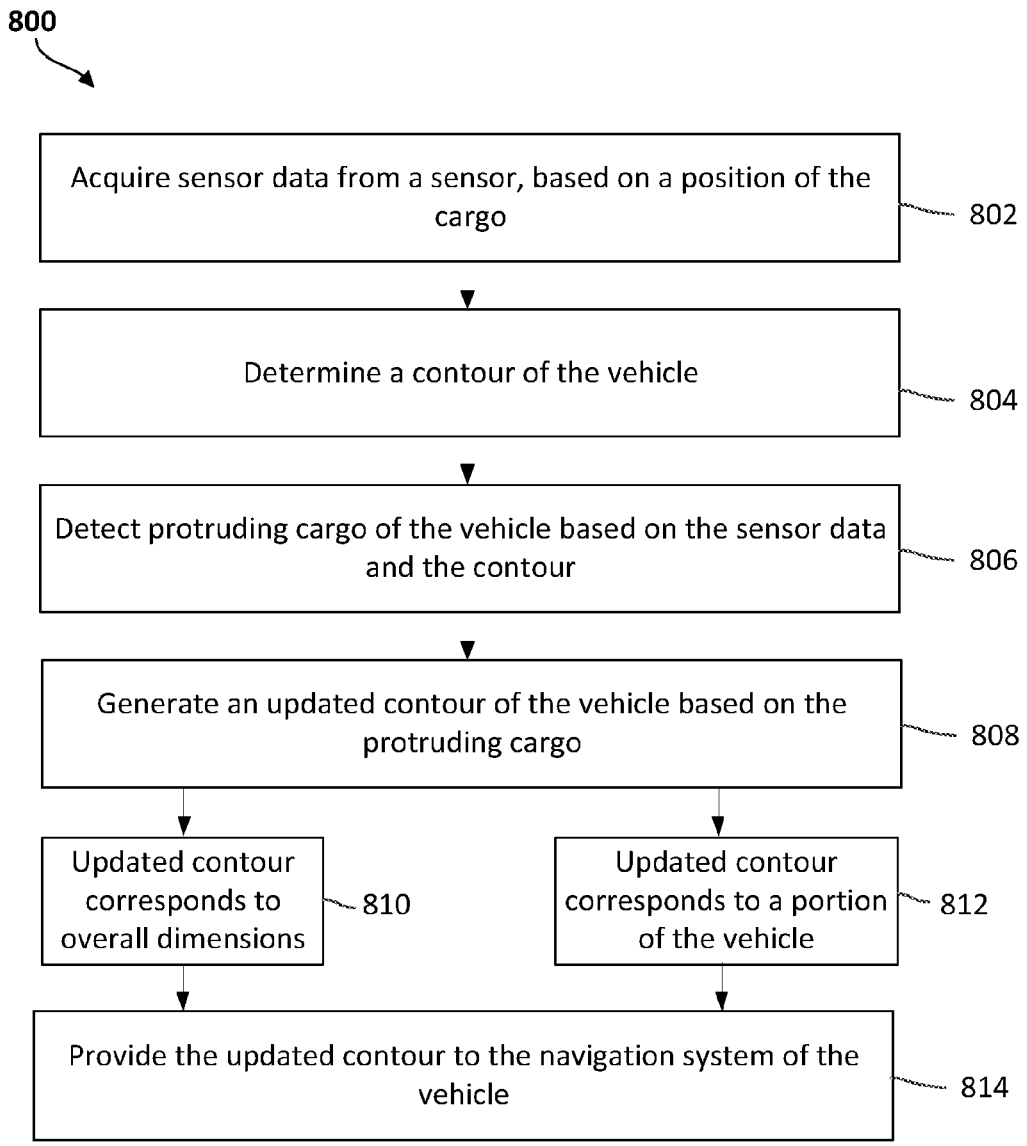
FIG. 8 is a flowchart of a process for informing a navigation system of a vehicle of a protrusion according to one embodiment.

Referring to FIG. 8, a flow diagram of a process 800 for informing a navigation system of the vehicle of the protruding cargo is shown, according to one embodiment. In alternative embodiments, fewer, additional, and/or different steps may be performed. Also, the use of a flow diagram is not meant to be limiting with respect to the order of steps performed. Sensor data is acquired from a sensor, where the sensor data is generally based on a position of the cargo (802). The contour of the vehicle is determined (804). The contour may be determined from the sensor data, provided by a configuration file, manually input via a user interface, etc. The sensor data and contour is analyzed to detect protruding cargo (806). If protruding cargo is detected, an updated contour of the vehicle is generated based on the protrusion (808). The updated contour may correspond to overall updated vehicle dimensions (810), or the updated contour may be localized to a particular portion of the vehicle (812). The updated contour is provided to the navigation system of the vehicle (814). Data may be formatted and sent to the navigation system according to the specifications of the particular vehicle.

Figure 9:
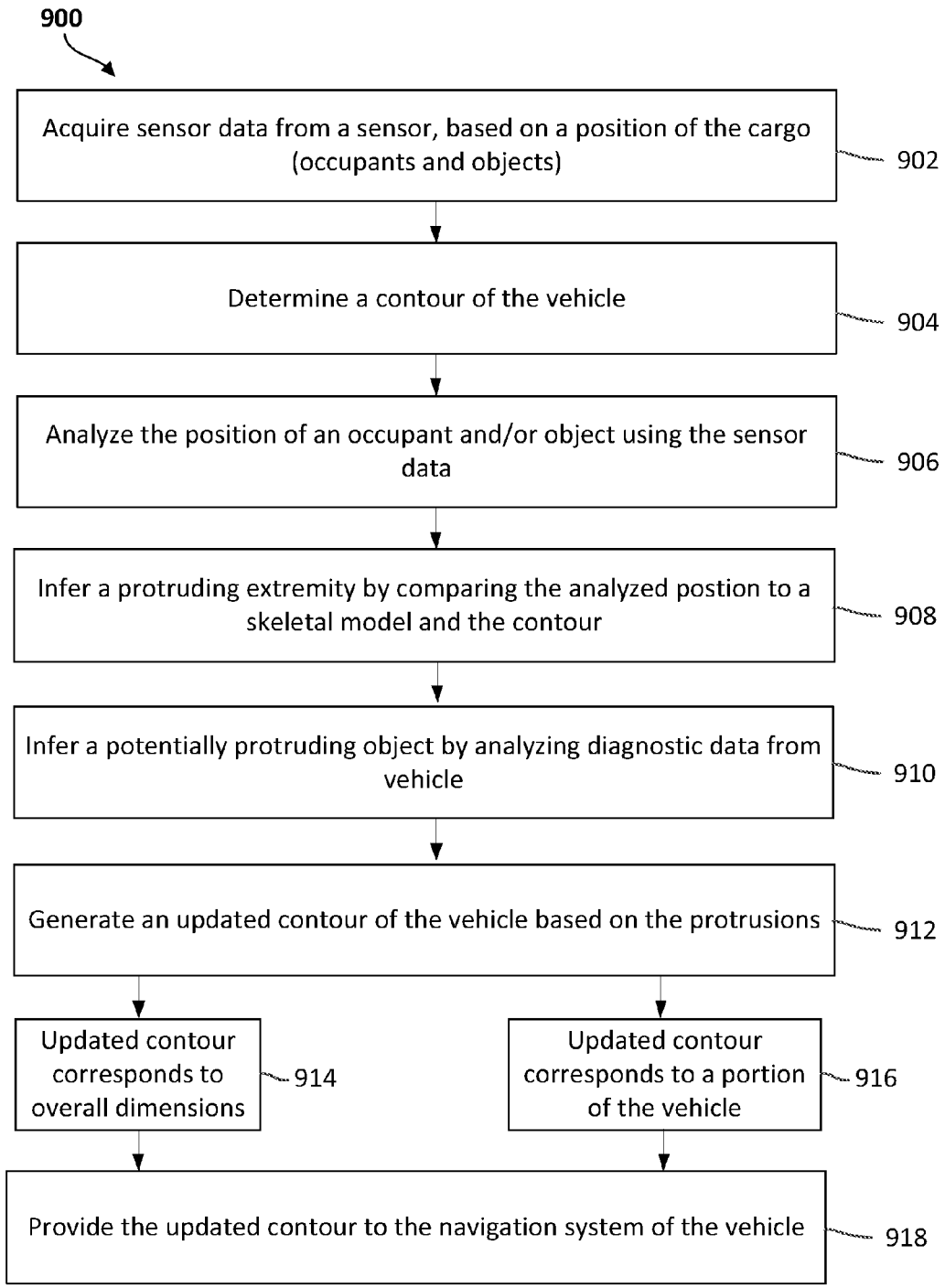
FIG. 9 is a flowchart of a process for informing a navigation system of a vehicle of a protrusion according to one embodiment.

Referring to FIG. 9, a flow diagram of a process 900 for informing a navigation system of the vehicle of the protruding cargo is shown, according to one embodiment. In alternative embodiments, fewer, additional, and/or different steps may be performed. Also, the use of a flow diagram is not meant to be limiting with respect to the order of steps performed. Sensor data is acquired from a sensor, where the sensor data is generally based on a position of the cargo including occupants and objects (902). The contour of the vehicle is determined (904). The contour may be determined from the sensor data, provided by a configuration file, manually input via a user interface, etc. The position of an occupant and/or object is analyzed using the sensor data (906). A protruding extremity of the occupant is estimated or inferred by comparing the analyzed position to a skeletal model and the contour (908). Data from a diagnostic system of the vehicle (e.g., speedometer, tire pressure system, stability system, etc.) may be analyzed to infer a potentially protruding object (910). Alternatively, a protruding object may be inferred based on knowledge of the object (e.g., a model) as described above. An updated contour of the vehicle is generated based on detected protrusions (912). The updated contour may correspond to overall updated vehicle dimensions (914), or the updated contour may be localized to a particular portion of the vehicle (916). The updated contour is provided to the navigation system of the vehicle (918).

Figure 10:
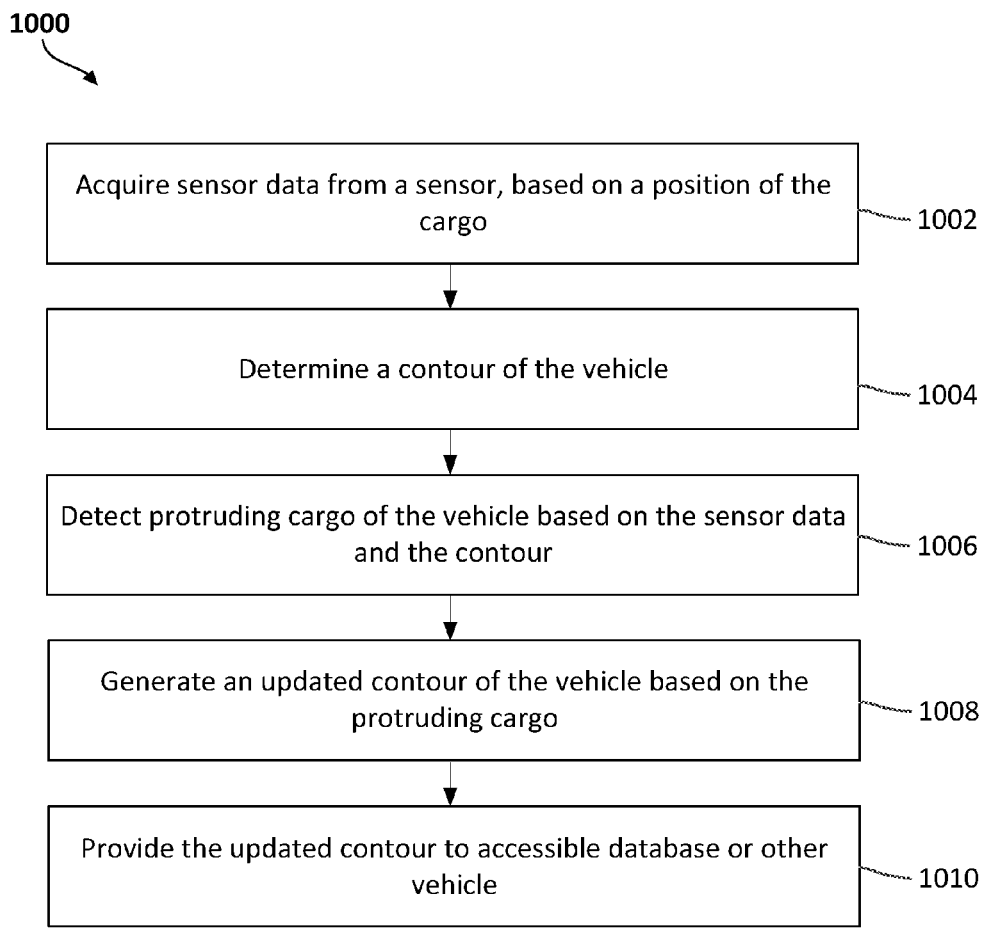
FIG. 10 is a flowchart of a process for informing a navigation system of a vehicle of a protrusion according to one embodiment.

Referring to FIG. 10, a flow diagram of a process 1000 for informing a navigation system of the vehicle of the protruding cargo is shown, according to one embodiment. In alternative embodiments, fewer, additional, and/or different steps may be performed. Also, the use of a flow diagram is not meant to be limiting with respect to the order of steps performed. Sensor data is acquired from a sensor, where the sensor data is generally based on a position of the cargo (1002). The contour of the vehicle is determined (1004). The sensor data and contour is analyzed to detect protruding cargo (1006). If protruding cargo is detected, an updated contour of the vehicle is generated based on the protruding cargo (1008). The updated contour is provided to an accessible database or another vehicle (1010). Data may be transmitted wirelessly as described herein.

Figure 11:
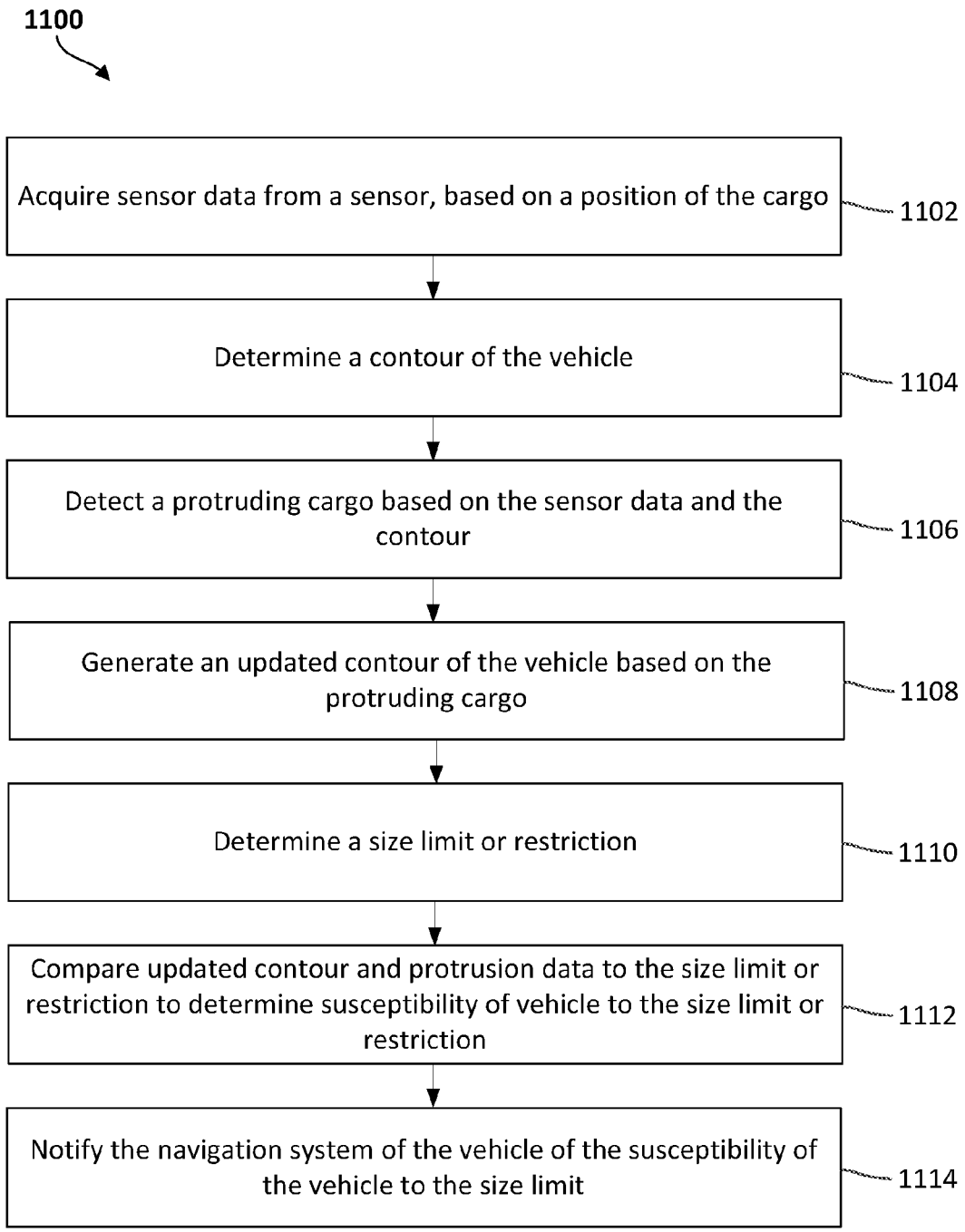
FIG. 11 is a flowchart of a process for identifying a susceptibility of a vehicle to a size restriction according to one embodiment.

Referring to FIG. 11, a flow diagram of a process 1100 for identifying a susceptibility of a vehicle to a size restriction is shown, according to one embodiment. In alternative embodiments, fewer, additional, and/or different steps may be performed. Also, the use of a flow diagram is not meant to be limiting with respect to the order of steps performed. Sensor data is acquired from a sensor, where the sensor data is generally based on a position of the cargo (1102). The contour of the vehicle is determined (1104). The sensor data and contour is analyzed to detect protruding cargo (1106). If protruding cargo is detected, an updated contour of the vehicle is generated based on the protruding cargo (1108). A size limit (or restriction) along the route of the vehicle is determined (1110). The size limit may be provided by the navigation system of the vehicle, a database, or mapping application, etc. The size limit is compared to the updated contour and protrusion to determine a susceptibility of vehicle to the size limit or restriction (1112). If the vehicle including the protrusion is determined to be susceptible to a size limit and/or restriction, the navigation system of the vehicle is notified and is provided relevant data (1114).

Figure 12:
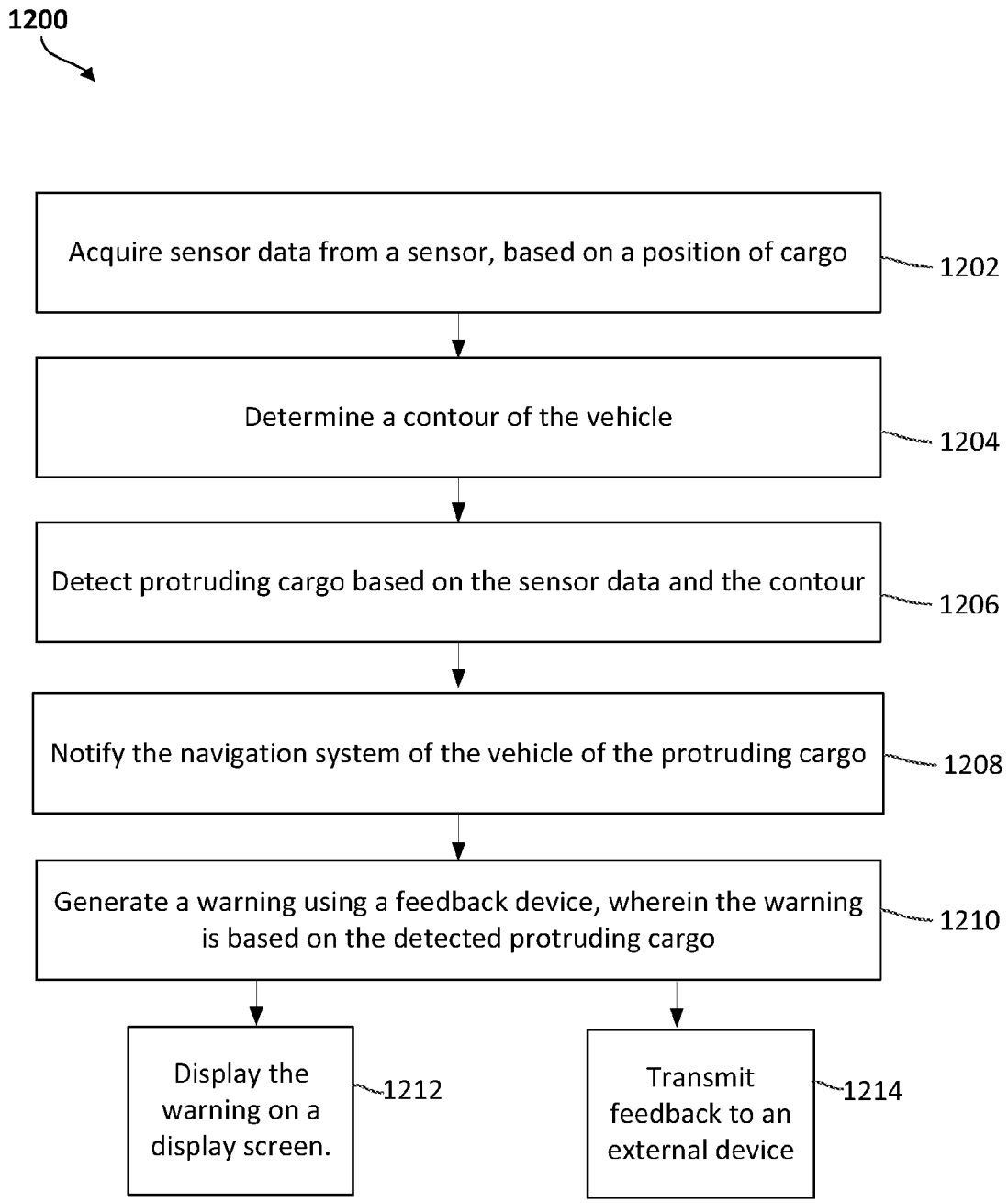
FIG. 12 is a flowchart of a process for informing a navigation system of a vehicle of a protrusion according to one embodiment.

Referring to FIG. 12, a flow diagram of a process 1200 for warning of the protruding body parts of a vehicle occupant is shown, according to one embodiment. In alternative embodiments, fewer, additional, and/or different steps may be performed. Also, the use of a flow diagram is not meant to be limiting with respect to the order of steps performed. Sensor data is acquired from a sensor (1202), where the sensor data is generally based on a position of cargo. The contour of the vehicle is determined (1204). Protruding cargo is detected based on the sensor data and the contour of the vehicle (1206). The navigation system of the vehicle is notified of the protrusion (1208). A warning is also generated based on the protruding cargo and is output using a feedback device (1210). For example, the warning may include visual information displayed on a display screen (1212), or the warning information may be transmitted to another external device (1214).

Figure 13:
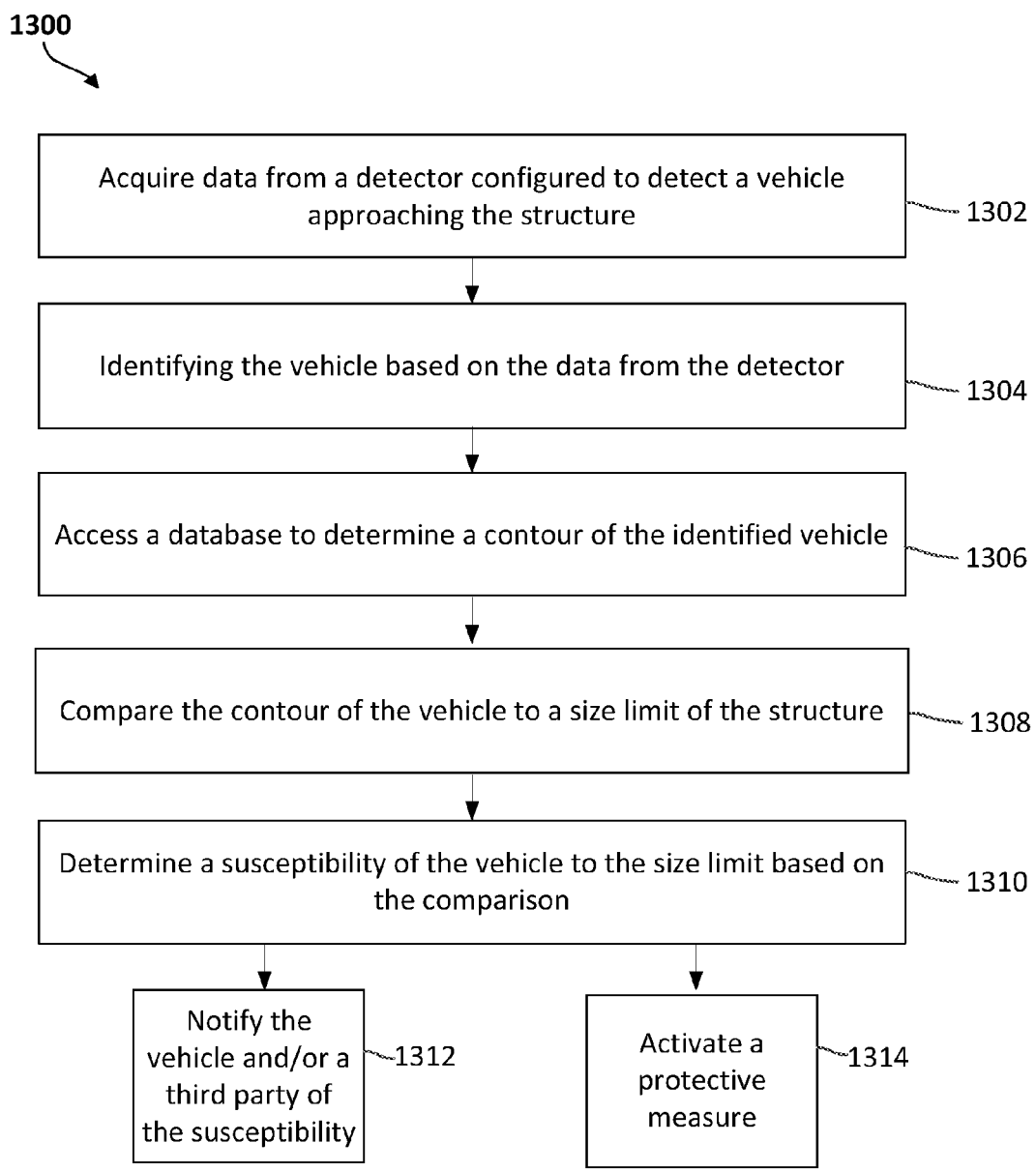
FIG. 13 is a flowchart of a process of identifying a susceptibility of a vehicle approaching a structure to a size restriction of the structure according to one embodiment.

Referring to FIG. 13, a flow diagram of a process 1300 for identifying a susceptibility of a vehicle approaching a structure to a size restriction of the structure is shown, according to one embodiment. In alternative embodiments, fewer, additional, and/or different steps may be performed. Also, the use of a flow diagram is not meant to be limiting with respect to the order of steps performed. Data is acquired from a detector configured to detect an approaching vehicle (1302). The detector may include various sensors/cameras, etc., as described herein, and may be located on the structure (e.g., a garage, an overpass, a tunnel, an bridge, etc.), near the structure, or a distance from the structure. The vehicle is identified based on data from the detector (1304). A database is accessed to determine a contour of the identified vehicle (1306). The database is configured to store vehicle contour information and may be hosted by the systems of the vehicle, by a third party, or by the systems of the structure. The contour information may be based on the manufacturer specifications for the particular vehicle, or may be an updated contour based on any protrusions or modifications of the vehicle. An updated contour may be generated as described herein and may be provided to the database by the vehicle. The size limit/restriction of the structure and the contour of the vehicle are compared (1308), and based on the comparison the impact susceptibility of the vehicle is determined (1310). Responsive to a determined susceptibility, the vehicle (or systems of the vehicle) or a third party (e.g., emergency responders, police, firefighters, other vehicles, etc.) may be notified of the vehicle's susceptibility (1312). The notification and details related to the event may also be logged in a database. Additionally, protective measures, such as a barrier or airbag and the like, may be activated (1314).

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for informing a navigation system of a vehicle of a protrusion, comprising:
   a sensor configured to generate sensor data based on a position of cargo; and
   a processing circuit configured to:
   determine a contour of the vehicle;
   detect protruding cargo extending outside the contour of the vehicle, wherein detecting the protruding cargo is based on the sensor data and the contour; and
   notify the navigation system of the vehicle of the protruding cargo;
   wherein the protruding cargo includes an occupant of the vehicle, wherein the protruding cargo includes a protruding extremity of the occupant, wherein detecting the protruding cargo is based on information related to skeletal anatomy; and
   wherein detecting the protruding cargo comprises estimating the protruding extremity based on the skeletal anatomy and a non-protruding portion of the occupant.

2. The system of claim 1, wherein the processing circuit is further configured to generate an updated contour of the vehicle based on the protruding cargo, and wherein notifying the navigation system of the vehicle of the protruding cargo includes notifying the navigation system of the updated contour.

3. The system of claim 2, further comprising a transmitter configured to transmit data related to the protruding cargo and wherein the processing circuit is further configured to transmit the updated contour to an external device.

4. The system of claim 1, wherein the sensor is coupled to the vehicle.

5. The system of claim 4, wherein the sensor includes a camera.

6. The system of claim 5, wherein detecting the protruding cargo includes analyzing imaging data generated by the camera.

7. The system of claim 4, wherein the sensor includes a radar device.

8. The system of claim 1, wherein the contour of the vehicle is determined based on the sensor data.

9. The system of claim 1, wherein the skeletal anatomy is based on a model of the occupant or a model of an average human.

10. The system of claim 1, wherein the sensor includes a pressure sensor configured to generate pressure data at a particular location of the vehicle, and wherein the processing circuit is further configured to detect the non-protruding portion of the occupant based on the pressure data.

11. The system of claim 1, wherein the sensor includes a capacitive sensor configured to generate touch data at a particular location of the vehicle, and wherein the processing circuit is further configured to detect the non-protruding portion of the occupant based on the touch data.

12. The system of claim 1, wherein the processing circuit is further configured to infer a potential dynamic protrusion of the cargo, and wherein detecting the protruding cargo is further based on the inferred potential dynamic protrusion.

13. The system of claim 1, wherein detecting the protruding cargo includes determining an amount of protrusion of the protruding cargo.

14. The system of claim 1, wherein the sensor includes an RFID sensor, and wherein at least one RFID tag is coupled to the cargo.

15. The system of claim 14, wherein the RFID sensor is a first RFID sensor, wherein the sensor further includes a second RFID sensor, and wherein detecting the protruding cargo is further based on a distance of the RFID tag from the first and second RFID sensors.

16. The system of claim 1, wherein the sensor includes an optical sensor system coupled to the vehicle, and wherein the optical sensor system is configured to generate information related to objects crossing an optical path of the optical sensor system, and wherein detecting the protruding cargo is further based on the information from the optical sensor system related to objects crossing the optical path.

17. The system of claim 1, further comprising a graphical user interface configured to provide an input to the processing circuit, wherein the input is related to a dimension of the cargo, and wherein detecting the protruding cargo is further based on the input.

18. The system of claim 1, wherein the contour includes a trailer of the vehicle, and wherein the cargo is a load of the trailer.

* * * * *